US012348699B2

(12) United States Patent
Matsunobu et al.

(10) Patent No.: US 12,348,699 B2
(45) Date of Patent: Jul. 1, 2025

(54) THREE-DIMENSIONAL RECONSTRUCTION METHOD, THREE-DIMENSIONAL RECONSTRUCTION DEVICE, AND COMPUTER

(71) Applicant: Panasonic Intellectual Property Corporation of America, Torrance, CA (US)

(72) Inventors: Toru Matsunobu, Osaka (JP); Toshiyasu Sugio, Osaka (JP); Satoshi Yoshikawa, Hyogo (JP); Masaki Fukuda, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 36 days.

(21) Appl. No.: 17/081,410

(22) Filed: Oct. 27, 2020

(65) Prior Publication Data

US 2021/0044787 A1 Feb. 11, 2021

Related U.S. Application Data

(63) Continuation of application No. PCT/JP2019/021330, filed on May 29, 2019.
(Continued)

(51) Int. Cl.
*H04N 13/111* (2018.01)
*H04N 13/25* (2018.01)
(Continued)

(52) U.S. Cl.
CPC .......... *H04N 13/111* (2018.05); *H04N 13/25* (2018.05); *H04N 13/243* (2018.05); *H04N 13/296* (2018.05)

(58) Field of Classification Search
CPC .... H04N 13/111; H04N 13/25; H04N 13/296; H04N 13/243
(Continued)

(56) References Cited

U.S. PATENT DOCUMENTS 8,331,615 B2   12/2012  Furukawa et al.
9,571,819 B1*   2/2017  Barron ................. H04N 13/128
(Continued)

OTHER PUBLICATIONS

International Search Report (ISR) issued on Aug. 20, 2019 in International (PCT) Application No. PCT/JP2019/021330.
(Continued)

*Primary Examiner* — Joseph G Ustaris
*Assistant Examiner* — Jimmy S Lee
(74) *Attorney, Agent, or Firm* — Wenderoth, Lind & Ponack, L.L.P.

(57) ABSTRACT

A three-dimensional reconstruction method of generating a three-dimensional model including a three-dimensional point cloud using images obtained by image capturing devices that capture a common three-dimensional space includes acquiring the images captured at corresponding timings and generating three-dimensional points based on the acquired images. The generating includes generating one or more first three-dimensional points based on a result of a first matching performed on points in two or more first images obtained by two or more first image capturing devices, of the image capturing devices, having fields of view with higher similarity than a predetermined threshold, and generating one or more second three-dimensional points based on a result of a second matching performed on points in two or more second images obtained by two or more second image capturing devices, included in the image capturing devices, having fields of view with lower similarity than the predetermined threshold.

8 Claims, 23 Drawing Sheets

Related U.S. Application Data

(60) Provisional application No. 62/677,933, filed on May 30, 2018.

(51) Int. Cl.
  *H04N 13/243* (2018.01)
  *H04N 13/296* (2018.01)

(58) Field of Classification Search
  USPC .......................................................... 348/47
  See application file for complete search history.

(56) References Cited

U.S. PATENT DOCUMENTS

| | | | |
|---|---|---|---|
| 10,855,971 B2* | 12/2020 | Saunders | H04N 13/243 |
| 2006/0092280 A1* | 5/2006 | Kamijo | G06V 10/255 |
| | | | 348/169 |
| 2011/0169921 A1* | 7/2011 | Lee | H04N 23/67 |
| | | | 348/46 |
| 2013/0083966 A1 | 4/2013 | Furukawa et al. | |
| 2013/0107014 A1* | 5/2013 | Masuda | H04N 13/239 |
| | | | 348/47 |
| 2013/0307936 A1* | 11/2013 | Kim | G06T 7/337 |
| | | | 348/47 |
| 2014/0340486 A1* | 11/2014 | Asano | H04N 13/144 |
| | | | 348/47 |
| 2015/0116462 A1* | 4/2015 | Makabe | G06F 18/22 |
| | | | 348/47 |
| 2015/0310621 A1* | 10/2015 | Matono | H04N 13/239 |
| | | | 348/47 |
| 2015/0332464 A1* | 11/2015 | O'Keefe | H04N 13/128 |
| | | | 348/47 |
| 2017/0078648 A1* | 3/2017 | Saunders | H04N 13/117 |
| 2017/0201736 A1* | 7/2017 | Ishimaru | H04N 13/246 |
| 2017/0230585 A1* | 8/2017 | Nash | H04N 17/002 |
| 2018/0189979 A1* | 7/2018 | Lin | H04N 13/239 |

OTHER PUBLICATIONS

Kenji Takita, et al., "A Sub-Pixel Correspondence Search Technique for Computer Vision Applications", IEICE Transactions on Fundamentals of Electronics, Communications and Computer Sciences, vol. E87A, No. 8, Aug. 2004, pp. 1913-1923.

* cited by examiner

THREE-DIMENSIONAL RECONSTRUCTION METHOD, THREE-DIMENSIONAL RECONSTRUCTION DEVICE, AND COMPUTER

CROSS REFERENCE TO RELATED APPLICATIONS

This application is a U.S. continuation application of PCT International Patent Application Number PCT/JP2019/021330 filed on May 29, 2019, claiming the benefit of priority of U.S. Provisional Patent Application No. 62/677,933 filed on May 30, 2018, the entire contents of which are hereby incorporated by reference.

BACKGROUND

1. Technical Field

The present disclosure relates to a three-dimensional reconstruction method, a three-dimensional reconstruction device, and a computer for generating a three-dimensional model with the use of a plurality of images obtained by a plurality of cameras.

2. Description of the Related Art

According to a three-dimensional reconstruction technique in the field of computer vision, a plurality of two-dimensional images are mapped to each other to estimate the positions and the orientations of the cameras and the three-dimensional position of an object. In addition, the cameras are calibrated, and a three-dimensional point cloud is reconstructed.

For example, U.S. Patent Application Publication No. 2013/0083966 discloses three-dimensional modeling through a multi-viewpoint stereo technique that is based on three-dimensional patches each having a normal vector in a small plane centered on a three-dimensional point.

K. Takita, M. A. Muquit, T. Aoki, and T. Higuchi, "A Sub-Pixel Correspondence Search Technique for Computer Vision Applications," IEICE TRANS. FUNDAMENTALS, VOL. E87-A. August 2004. discloses a small region matching of a pair of images through a phase-only correlation method.

SUMMARY

According to one aspect of the present disclosure, a three-dimensional reconstruction method is provided. The three-dimensional reconstruction method generates a three-dimensional model including a three-dimensional point cloud with the use of a plurality of images obtained from a plurality of image capturing devices that are disposed at different positions and capture a common three-dimensional space. The three-dimensional reconstruction method includes acquiring the plurality of images, which are captured by the plurality of image capturing devices at corresponding timings, and generating a plurality of three-dimensional points based on the plurality of images acquired. The generating of the plurality of three-dimensional points includes performing, between two or more first images included in the plurality of images, a first matching on points in the two or more first images and generating one or more first three-dimensional points based on a first matching result obtained. The two or more first images are obtained respectively by two or more first image capturing devices included in the plurality of image capturing devices. The two or more first image capturing devices have respective fields of view with a degree of similarity higher than or equal to a predetermined threshold. The generating of the plurality of three-dimensional points further includes performing, between two or more second images included in the plurality of images, a second matching with an accuracy lower than an accuracy of the first matching on points in the two or more second images and generating one or more second three-dimensional points based on a second matching result obtained. The two or more second images are obtained respectively by two or more second image capturing devices included in the plurality of image capturing devices. The two or more second image capturing devices have respective fields of view with the degree of similarity lower than the predetermined threshold.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
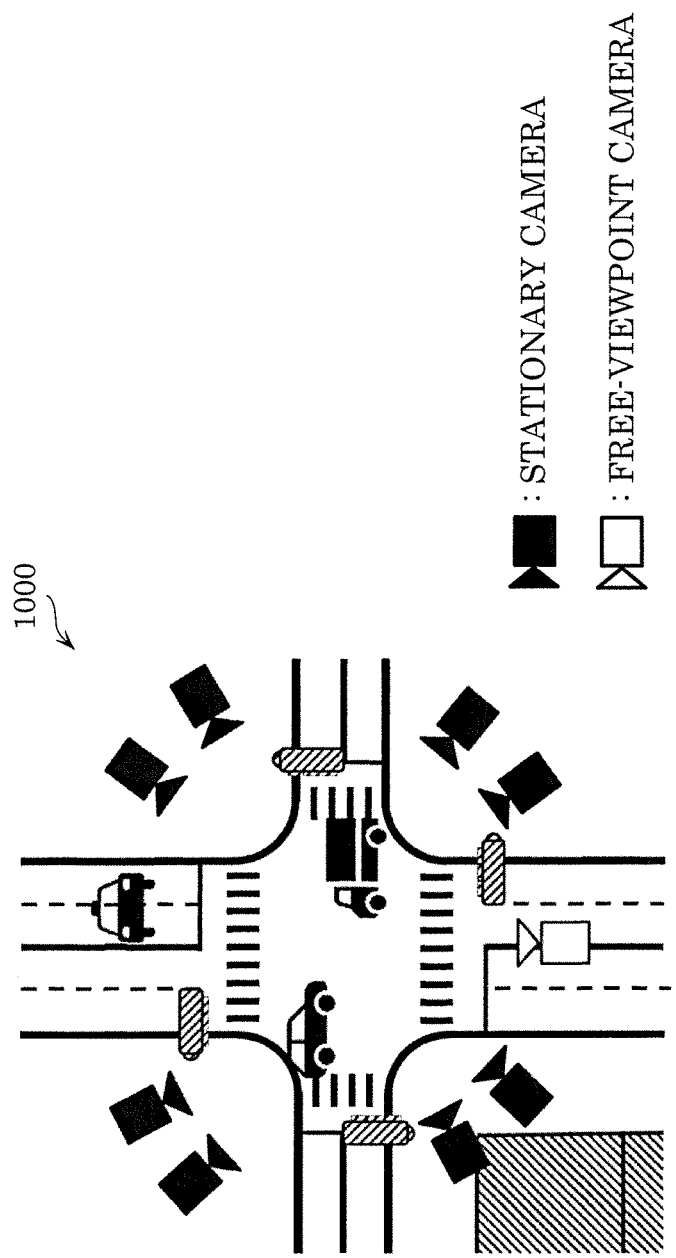
FIG. 1 illustrates an overview of a three-dimensional reconstruction system according to an embodiment.

Underlying Knowledge Forming Basis of the Present Disclosure

According to U.S. Patent Application Publication No. 2013/0083966, feature points are mapped between two-dimensional images to calculate sparse three-dimensional points. The sparse three-dimensional points are then expanded to increase the number of three-dimensional points, and thus dense three-dimensional points are calculated. In expanding the three-dimensional points, first, a three-dimensional point candidate is calculated, and this three-dimensional point candidate is added to the dense three-dimensional points only when the evaluation value of this three-dimensional point candidate is smaller than a threshold. The evaluation value used in this case is composed of the degree of discrepancy between small regions of a pair of images of the multi-viewpoint images containing the three-dimensional point candidate.

However, since the three-dimensional points are expanded based on the sparse three-dimensional points in the method disclosed in U.S. Patent Application Publication No. 2013/0083966, this poses a technical problem in that an error, if any, in the original sparse three-dimensional points propagates to the expanded and added three-dimensional points.

In this respect, it is conceivable to generate a three-dimensional point by using a high-accuracy technique such as the one disclosed in Takita et al. (2004). According to Takita et al. (2004), a small region matching of a pair of images is performed through a phase-only correlation method, and thus correspondence points are calculated with fractional pixel accuracy. Specifically, small regions of a pair of images are subjected to Fourier transform to convert them into amplitude signals and phase signals, and the phase signals of the pair of images are combined and subjected to inverse transform. Thus, correspondence points are calculated with $1/100$ pixel accuracy.

Although the method disclosed in Takita et al. (2004) allows a more accurate result to be obtained as the degree of similarity is higher between the fields of view of the image capturing devices that have obtained the pair of images, there remains a technical problem in that the accuracy decreases when the fields of view of a pair of images have a low degree of similarity. If the process according to the method disclosed in Takita et al. (2004) is executed on a pair of images where their fields of view have a low degree of similarity, this leads to a technical problem in that the process takes an extended time.

Accordingly, in the present disclosure, a three-dimensional reconstruction method and a three-dimensional reconstruction device that make it possible to generate a highly accurate three-dimensional model at high speed will be described.

The three-dimensional reconstruction method according to one aspect of the present disclosure is a three-dimensional reconstruction method of generating a three-dimensional model including a three-dimensional point cloud with the use of a plurality of images obtained from a plurality of image capturing devices that are disposed at different positions and capture a common three-dimensional space. The three-dimensional reconstruction method includes acquiring the plurality of images, which are captured by the plurality of image capturing devices at corresponding timings, and generating a plurality of three-dimensional points based on the plurality of acquired images. The generating of the plurality of three-dimensional points includes performing, between two or more first images included in the plurality of images, a first matching on points in the two or more first images and generating one or more first three-dimensional points based on an obtained first matching result. The two or more first images are obtained by two or more respective first image capturing devices included in the plurality of image capturing devices. The two or more first image capturing devices have respective fields of view with a degree of similarity higher than or equal to a predetermined threshold. The generating of the plurality of three-dimensional points further includes performing, between two or more second images included in the plurality of images, a second matching with an accuracy lower than an accuracy of the first matching on points in the two or more second images and generating one or more second three-dimensional points based on an obtained second matching result. The two or more second images are obtained by two or more respective second image capturing devices included in the plurality of image capturing devices. The two or more second image capturing devices have respective fields of view with the degree of similarity lower than the predetermined threshold.

According to the above, one or more first three-dimensional points are generated by performing the high-accuracy first matching on two or more first images obtained by two or more first image capturing devices having fields of view with a high degree of similarity, and thus a highly accurate three-dimensional point can be obtained at high speed. Meanwhile, one or more second three-dimensional points are generated by performing the second matching with lower accuracy on two or more second images obtained by two or more second image capturing devices having fields of view with a low degree of similarity, and this can help reduce the possibility that a low-accuracy three-dimensional point is generated and the process takes an extended time. In this manner, one of the first matching and the second matching is selectively executed depending on the degree of similarity between the fields of view, and thus a highly accurate three-dimensional model can be generated at high speed.

The generating of the plurality of three-dimensional points may include performing first generating of generating the plurality of three-dimensional points by matching, between the plurality of images, a plurality of feature points included in each of the plurality of acquired images. The first generating may include detecting a plurality of feature points from each of the plurality of acquired images, performing the first matching on the plurality of feature points in each of the two or more first images between the two or more first images and generating the one or more first three-dimensional points based on the obtained first matching result, and performing the second matching on the plurality of feature points in each of the two or more second images between the two or more second images and generating the one or more second three-dimensional points based on the obtained second matching result.

According to the above, in generating a sparse three-dimensional point cloud, one of the first matching and the second matching is selectively executed depending on the degree of similarity between the fields of view, and thus a highly accurate three-dimensional model can be generated at high speed.

Each of the plurality of three-dimensional points may be a three-dimensional patch that indicates a three-dimensional position of a point on a surface of an object and a normal direction of the point perpendicular to the surface. The generating of the one or more first three-dimensional points in the first generating may include performing the first matching on each of a plurality of feature points in one first image of a first pair to be processed that includes two first images of the two or more first images to calculate a first correspondence point that corresponds to a feature point to be processed from the other first image of the first pair to be processed; calculating a first three-dimensional patch with the use of the feature point to be processed, the calculated first correspondence point, a camera parameter of a third image capturing device that has obtained the one first image, and a camera parameter of a fourth image capturing device that has obtained the other first image; and correcting a normal direction of the first three-dimensional patch so as to minimize an evaluation value indicating projection consistency with the use of the first three-dimensional patch and one or more first two-dimensional points obtained by projecting the first three-dimensional patch onto each of one or more first visible images containing the first three-dimensional patch and generating a corrected first three-dimensional patch as the one or more first three-dimensional points.

According to the above, in generating a sparse three-dimensional point cloud, a three-dimensional point cloud is generated with the use of the first matching for a first pair obtained when the degree of similarity between the fields of view is high, and thus a highly accurate three-dimensional model can be generated at high speed.

The generating of the one or more second three-dimensional points in the first generating may include performing the second matching on each of a plurality of feature points in one second image of a second pair to be processed that includes two second images of the two or more second images to calculate a second correspondence point that corresponds to the feature point to be processed from the other second image of the second pair to be processed; calculating a second three-dimensional patch with the use of the feature point to be processed, the calculated second correspondence point, a camera parameter of a sixth image capturing device that has obtained the one second image, and a camera parameter of a seventh image capturing device that has obtained the other second image; and correcting a three-dimensional position and a normal direction of the second three-dimensional patch and a position of each of one or more second two-dimensional points so as to minimize an evaluation value indicating projection consistency with the use of the second three-dimensional patch and the one or more second two-dimensional points obtained by projecting the second three-dimensional patch onto each of one or more second visible images containing the second three-dimensional patch and generating a corrected second three-dimensional patch as the one or more second three-dimensional points.

According to the above, in generating a sparse three-dimensional point cloud, a three-dimensional point cloud is generated with the use of the second matching that is based on geometric consistency for a second pair obtained when the degree of similarity between the fields of view is low, and this can help reduce the possibility that a low-accuracy three-dimensional point is generated and the process takes an extended time.

The generating of the plurality of three-dimensional points may further include performing second generating of generating a new three-dimensional point with the use of the plurality of images and a first three-dimensional point cloud including the one or more first three-dimensional points and the one or more second three-dimensional points generated in the first generating and adding the generated new three-dimensional point to the first three-dimensional point cloud. The second generating may include performing the first matching, between the two or more first images, on each of a plurality of neighboring three-dimensional points in the vicinity of a plurality of third three-dimensional points composing the first three-dimensional point cloud based on the plurality of neighboring three-dimensional points and the two or more first images and generating one or more new first three-dimensional points based on an obtained first matching result; performing the second matching, between the two or more second images, on each of a plurality of neighboring three-dimensional points in the vicinity of a plurality of third three-dimensional points composing the first three-dimensional point cloud based on the plurality of neighboring three-dimensional points and the two or more second images and generating one or more new second three-dimensional points based on an obtained second matching result; generating a second three-dimensional point cloud with an added three-dimensional point by adding the one or more new first three-dimensional points and the one or more new second three-dimensional points to the first three-dimensional point cloud; and reconstructing a second three-dimensional model with the use of the second three-dimensional point cloud.

According to the above, in generating a dense three-dimensional point cloud, one of the first matching and the second matching is selectively executed depending on the degree of similarity between the fields of view, and thus a highly accurate three-dimensional model can be generated at high speed.

The generating of the one or more new first three-dimensional points in the second generating may include projecting, for each of the plurality of third three-dimensional points, a third three-dimensional point to be processed onto one first image of a first pair to be processed to calculate a third two-dimensional point in the one first image; performing the first matching to calculate, from the other first image of the first pair to be processed, a third correspondence point that corresponds to a fourth two-dimensional point in a second cell, included in a plurality of cells composing the one first image, adjacent to a first cell containing the identified third two-dimensional point; calculating a third three-dimensional patch, or the plurality of neighboring three-dimensional points, with the use of the fourth two-dimensional point, the calculated third correspondence point, a camera parameter of a ninth image capturing device that has obtained the one first image, and a camera parameter of a tenth image capturing device that has obtained the other first image; and correcting a normal direction of the third three-dimensional patch so as to minimize an evaluation value indicating projection consistency with the use of the third three-dimensional patch and one or more fifth two-dimensional points obtained by projecting the third three-dimensional patch onto one or more third visible images containing the third three-dimensional patch and generating a corrected third three-dimensional patch as the one or more new first three-dimensional points.

According to the above, in generating a dense three-dimensional point cloud, a three-dimensional point cloud is generated with the use of the first matching for a first pair obtained when the degree of similarity between the fields of view is high, and thus a highly accurate three-dimensional model can be generated at high speed.

The generating of the one or more new second three-dimensional points in the second generating may include projecting, for each of the plurality of third three-dimensional points, a third three-dimensional point to be processed onto one second image of a second pair to be processed to calculate a sixth two-dimensional point in the one second image; calculating, as a three-dimensional position of a fourth three-dimensional patch of the third three-dimensional point to be processed, a three-dimensional position of an intersection in a reference patch plane of the fourth three-dimensional patch where the reference patch plane intersects with an optical axis of a twelfth image capturing device that has obtained the one second image passing through a seventh two-dimensional point in a fourth cell, included in a plurality of cells composing the one second image, adjacent to a third cell containing the identified sixth two-dimensional point, the fourth three-dimensional patch being the plurality of neighboring three-dimensional points; and correcting a three-dimensional position and a normal direction of the fourth three-dimensional patch and a position of each of one or more eighth two-dimensional points so as to minimize an evaluation value indicating projection consistency with the use of the fourth three-dimensional patch and the one or more eighth two-dimensional points obtained by projecting the fourth three-dimensional patch onto one or more fourth visible images containing the fourth three-dimensional patch and generating a corrected fourth three-dimensional patch as the one or more new second three-dimensional points.

According to the above, in generating a dense three-dimensional point cloud, a three-dimensional point cloud is generated based on geometric consistency for a second pair obtained when the degree of similarity between the fields of view is low, and this can help reduce the possibility that a low-accuracy three-dimensional point is generated and the process takes an extended time.

The generating of the plurality of three-dimensional points may further include performing second generating of generating a new three-dimensional point with the use of the plurality of images and a first three-dimensional point cloud stored in a storage and adding the generated new three-dimensional point to the first three-dimensional point cloud. The second generating may include performing the first matching, between the two or more first images, on each of a plurality of neighboring three-dimensional points in the vicinity of a plurality of third three-dimensional points composing the first three-dimensional point cloud based on the plurality of neighboring three-dimensional points and the two or more first images and generating one or more new first three-dimensional points based on an obtained first matching result; performing the second matching, between the two or more second images, on each of a plurality of neighboring three-dimensional points in the vicinity of a plurality of third three-dimensional points composing the first three-dimensional point cloud based on the plurality of neighboring three-dimensional points and the two or more second images and generating one or more new second three-dimensional points based on an obtained second matching result; generating a second three-dimensional point cloud with an added three-dimensional point by adding the one or more new first three-dimensional points and the one or more new second three-dimensional points to the first three-dimensional point cloud; and reconstructing a second three-dimensional model with the use of the second three-dimensional point cloud.

According to the above, in generating a dense three-dimensional point cloud, one of the first matching and the second matching is selectively executed depending on the degree of similarity between the fields of view, and thus a highly accurate three-dimensional model can be generated at high speed.

The generating of the one or more new first three-dimensional points in the second generating may include projecting, for each of the plurality of third three-dimensional points, a third three-dimensional point to be processed onto one first image of a first pair to be processed to calculate a third two-dimensional point in the one first image; performing the first matching to calculate, from the other first image of the first pair to be processed, a third correspondence point that corresponds to a fourth two-dimensional point in a second cell, included in a plurality of cells composing the one first image, adjacent to a first cell containing the identified third two-dimensional point; calculating a third three-dimensional patch with the use of the fourth two-dimensional point, the calculated third correspondence point, a camera parameter of a ninth image capturing device that has obtained the one first image, and a camera parameter of a tenth image capturing device that has obtained the other first image, the third three-dimensional patch being the plurality of neighboring three-dimensional points; and correcting a normal direction of the third three-dimensional patch so as to minimize an evaluation value indicating projection consistency with the use of the third three-dimensional patch and one or more fifth two-dimensional points obtained by projecting the third three-dimensional patch onto one or more third visible images containing the third three-dimensional patch and generating a corrected third three-dimensional patch as the one or more new first three-dimensional points.

According to the above, in generating a dense three-dimensional point cloud, a three-dimensional point cloud is generated with the use of the first matching for a first pair obtained when the degree of similarity between the fields of view is high, and thus a highly accurate three-dimensional model can be generated at high speed.

The generating of the one or more new second three-dimensional points in the second generating may include projecting, for each of the plurality of third three-dimensional points, a third three-dimensional point to be processed onto one second image of a second pair to be processed to calculate a sixth two-dimensional point in the one second image; calculating, as a three-dimensional position of a fourth three-dimensional patch of the third three-dimensional point to be processed, a three-dimensional position of an intersection in a reference patch plane of the fourth three-dimensional patch where the reference patch plane intersects with an optical axis of a twelfth image capturing device that has obtained the one second image passing through a seventh two-dimensional point in a fourth cell, included in a plurality of cells composing the one second image, adjacent to a third cell containing the identified sixth two-dimensional point; and correcting a three-dimensional position and a normal direction of the fourth three-dimensional patch and a position of each of one or more eighth two-dimensional points so as to minimize an evaluation value indicating projection consistency with the use of the fourth three-dimensional patch and the one or more eighth two-dimensional points obtained by projecting the fourth three-dimensional patch onto one or more fourth visible images containing the fourth three-dimensional patch and generating a corrected fourth three-dimensional patch as the one or more new second three-dimensional points.

According to the above, in generating a dense three-dimensional point cloud, a three-dimensional point cloud is generated based on geometric consistency for a second pair obtained when the degree of similarity between the fields of view is low, and this can help reduce the possibility that a low-accuracy three-dimensional point is generated and the process takes an extended time.

The first matching may include identifying, with fractional pixel accuracy, a correspondence point that corresponds to a point in one image of two or more images and that lies in another image of the two or more images. The second matching may include identifying, with integer pixel accuracy, a correspondence point that corresponds to a point in one image of two or more images and that lies in another image of the two or more images. Note that each of a fractional pixel and an integer pixel is an example of a processed unit and that the integer pixel is larger than the fractional pixel.

According to the above, in generating a sparse three-dimensional point cloud, one of the first matching with fractional pixel accuracy and the second matching with integer pixel accuracy is selectively executed depending on the degree of similarity between the fields of view, and thus a highly accurate three-dimensional model can be generated at high speed.

The first matching may be a matching that uses a phase-only correlation method.

This makes it possible to obtain a result of the first matching with fractional pixel accuracy.

The first matching may be a matching that uses a phase-only correlation method, and the second matching may be a matching that uses normalized cross-correlation.

This makes it possible to obtain a result of the first matching with fractional pixel accuracy and a result of the second matching with an accuracy lower than an accuracy of the result of the first matching.

A computer according to one aspect of the present disclosure is a computer for generating a three-dimensional point. The computer includes a receiver and a processor. The receiver is configured to receive a first image and a second image. The first image is generated by shooting a first field of view from a first viewpoint with at least one camera. The second image is generated by shooting a second field of view from a second viewpoint with the at least one camera. The first viewpoint is different from the second viewpoint. the processor is configured to: calculate a degree of similarity between the first field of view and the second field of view; determine whether the degree of similarity is equal to or higher than a threshold; perform a first matching on a first feature point in the first image and a second feature point in the second image if the degree of similarity is determined to be equal to or higher than the threshold; perform a second matching on the first feature point and the second feature point if the degree of similarity is determined to be lower than the threshold, second accuracy of the second matching being lower than first accuracy of the first matching; and generate the three-dimensional point based on a result of one of the first matching and the second matching, the three-dimensional point indicating a three-dimensional position in the first field of view and the second field of view.

The first image and the second image may be shot at a substantially same timing.

The degree of similarity may be calculated based on at least one of an angle or a distance. The angle may be an angle between a first view direction from the first viewpoint and a second view direction from the second viewpoint. The distance may be a distance between the first viewpoint and the second viewpoint.

The first image and the second image may be shot by a first camera and a second camera, respectively, in a state where the first camera and the second camera have a first angle of view and a second angle of view, respectively, where a first sensor of the first camera and a second sensor of the second camera have a first size and a second size, respectively, and where the first camera and the second camera have a first focal length and a second focal length, respectively. The degree of similarity may be calculated based on at least one of a first ratio of the first angle of view to the second angle of view, a second ratio of the first size to the second size, or a third ratio of the first focal length to the second focal length.

A size of a processed unit in the second matching may be larger than a size of a processed unit in the first matching such that the second accuracy is lower than the first accuracy.

A phase-only correlation scheme may be performed in the first matching and a normalized cross-correlation scheme may be performed in the second matching such that the second accuracy is lower than the first accuracy.

It is to be noted that general or specific embodiments of the above may be implemented in the form of a system, an apparatus, an integrated circuit, a computer program, or a computer-readable recording medium, such as a CD-ROM, or through any desired combination of a system, an apparatus, an integrated circuit, a computer program, and a recording medium.

Hereinafter, an embodiment will be described in concrete terms with reference to the drawings. It is to be noted that the embodiment described hereinafter illustrates a specific example of the present disclosure. The numerical values, the shapes, the materials, the constituent elements, the arrangement positions and the connection modes of the constituent elements, the steps, the order of the steps, and so on illustrated in the following embodiment are examples and are not intended to limit the present disclosure. Among the constituent elements in the following embodiment, any constituent element that is not described in an independent claim expressing the broadest concept is to be construed as an optional constituent element.

Embodiment

A three-dimensional reconstruction device according to the present embodiment can reconstruct a time-series three-dimensional model where the coordinate axes are consistent across the times. Specifically, first, the three-dimensional reconstruction device performs three-dimensional reconstruction independently at each given time to acquire three-dimensional models for the respective times. Then, the three-dimensional reconstruction device detects still cameras and a still object (still three-dimensional points), performs a coordinate matching of the three-dimensional models between the times with the use of the detected still cameras and still object, and generates a time-series three-dimensional model where the coordinate axes are consistent across the times.

FIG. 1 illustrates an overview of a three-dimensional reconstruction system. For example, a given space may be shot from multiple viewpoints with the use of calibrated cameras (e.g., stationary cameras). This makes it possible to three-dimensionally reconstruct shooting space 1000 (three-dimensional space reconstruction). Shooting space 1000 is a space to be shot jointly by a plurality of cameras. Shooting space 1000 is an example of a three-dimensional space. Tracking, scene analysis, and video rendering performed with the use of the three-dimensionally reconstructed data allows a video viewed from a desired viewpoint (free-viewpoint camera) to be generated. This makes it possible to achieve a next-generation wide range monitoring system and a three-dimensional reconstruction system.

Figure 2:
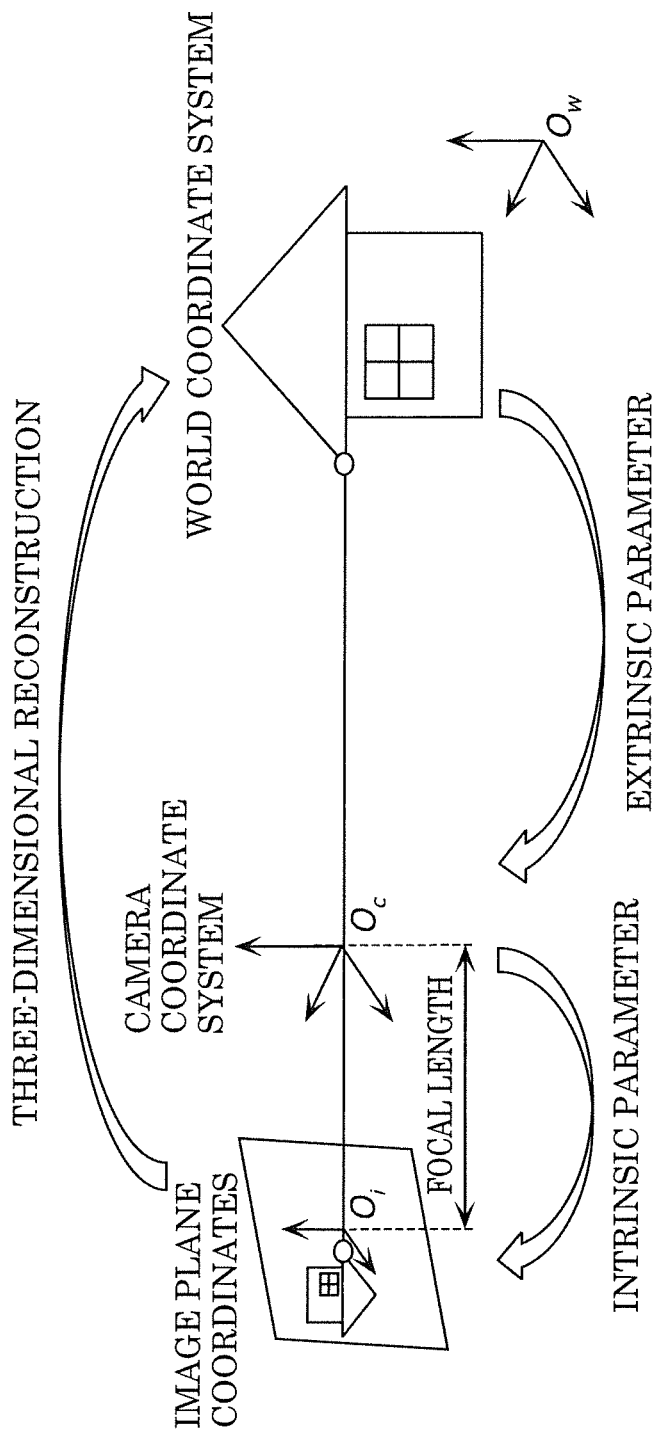
FIG. 2 is an illustration for describing a three-dimensional reconstruction process according to an embodiment.

Three-dimensional reconstruction according to the present disclosure will be defined. A video or an image of an object present in a real space shot by a plurality of cameras from different viewpoints is referred to as a multi-viewpoint video or a multi-viewpoint image. In other words, a multi-viewpoint image includes a plurality of two-dimensional images of an identical object shot from different viewpoints. In addition, multi-viewpoint images shot in time series are referred to as a multi-viewpoint video. Reconstructing an object onto a three-dimensional space with the use of a multi-viewpoint image is referred to as three-dimensional reconstruction. FIG. 2 illustrates a mechanism of three-dimensional reconstruction.

The three-dimensional reconstruction device reconstructs a point in an image plane onto the world coordinate system with the use of camera parameters. An object reconstructed onto a three-dimensional space is referred to as a three-dimensional model. A three-dimensional model of an object shows the three-dimensional position of each of a plurality of points on the object captured in multi-viewpoint two-dimensional images. A three-dimensional position is expressed by three-valued information composed of the X component, the Y component, and the Z component of a three-dimensional coordinate space defined by the X, Y, and Z axes, for example. A three-dimensional model may include not only the three-dimensional positions of the points but also information indicating the color of each point or the surface shape of each point and its peripheral area.

The three-dimensional reconstruction device may acquire the camera parameters of each camera in advance or may estimate the camera parameters of each camera simultaneously as the three-dimensional reconstruction device creates a three-dimensional model. The camera parameters include intrinsic parameters including, for example but not limited to, the focal length of each camera and the image center and extrinsic parameters indicating the three-dimensional position and the orientation of each camera.

FIG. 2 illustrates an example of a representative pinhole camera model. This model does not take the lens distortion of the camera into consideration. If the lens distortion is to be taken into consideration, the three-dimensional reconstruction device uses a correction position obtained by normalizing the position of a point on the image plane coordinates through a distortion model.

In three-dimensional reconstruction, calculating the camera parameters is referred to as camera calibration, and generating a three-dimensional model is referred to as three-dimensional modeling. In a three-dimensional reconstruction technique such as Structure from Motion, camera calibration and three-dimensional modeling are performed simultaneously, and the camera parameters and a three-dimensional model including a sparse three-dimensional point cloud can be calculated. Meanwhile, multi-viewpoint stereo allows a three-dimensional model including a dense three-dimensional point cloud to be calculated with the use of the camera parameters calculated in advance.

Figure 3:
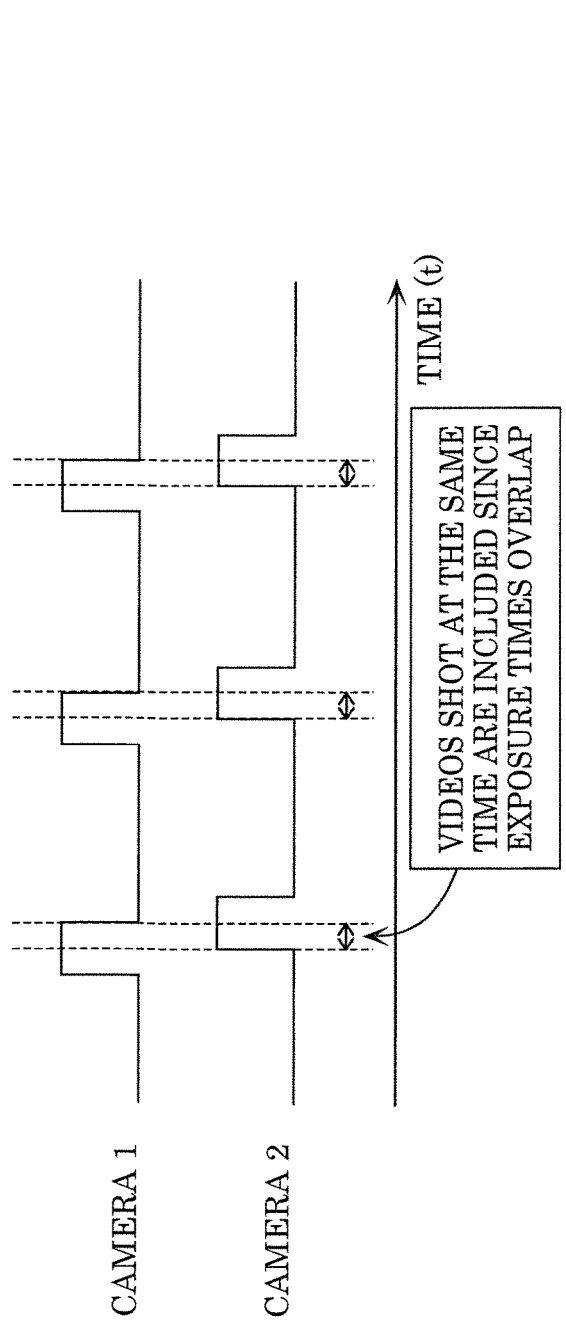
FIG. 3 is an illustration for describing synchronous shooting according to an embodiment.
Figure 4:
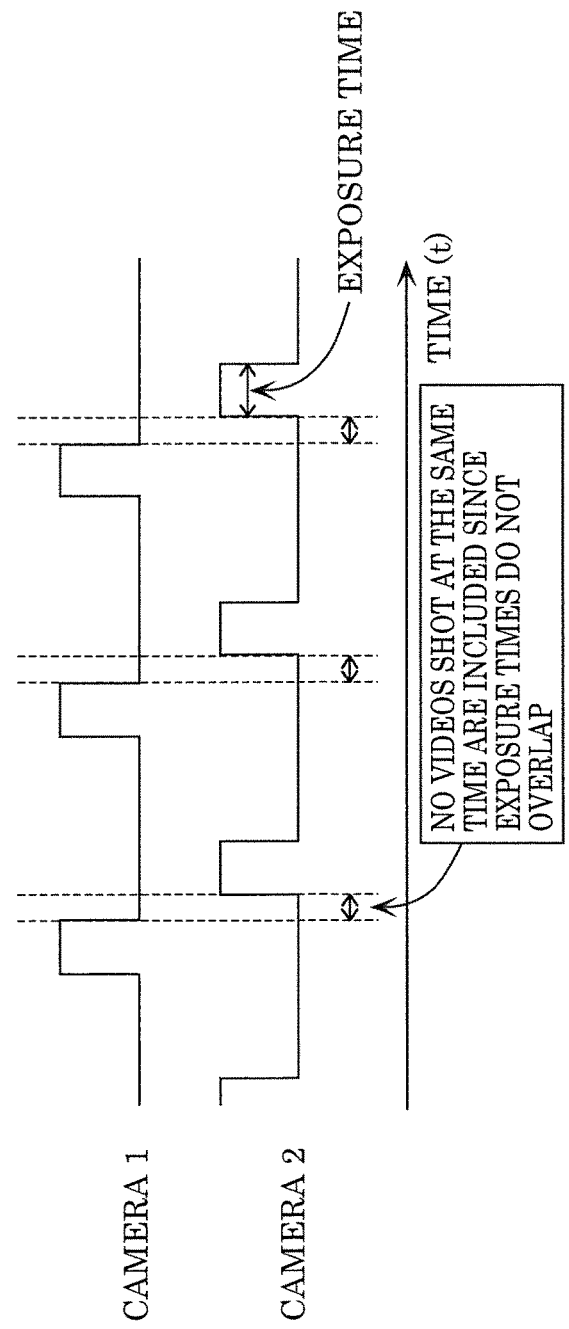
FIG. 4 is another illustration for describing synchronous shooting according to an embodiment.

Next, synchronous shooting of a multi-viewpoint video will be described. FIGS. 3 and 4 are illustrations for describing synchronous shooting. In FIGS. 3 and 4, the time is indicated along the horizontal direction, and the cameras are exposed while corresponding rectangular signals are on. When an image is to be acquired with a camera, the duration for which the shutter is open is referred to as an exposure time.

A scene exposed to an image sensor through the lens(es) during the exposure time is obtained as an image. In FIG. 3, the exposure times overlap between the images (also referred to below as "frames") shot by the two cameras from different viewpoints. In this case, the frames acquired by the two cameras are determined to be synchronous frames that each include a scene shot at the same time.

Meanwhile, in FIG. 4, there is no overlap in the exposure times of the two cameras. Therefore, the frames acquired by these two cameras are determined to be asynchronous frames that do not include any scene shot at the same time. Shooting synchronous frames with a plurality of cameras as in the case illustrated in FIG. 3 is referred to as synchronous shooting.

Figure 5:
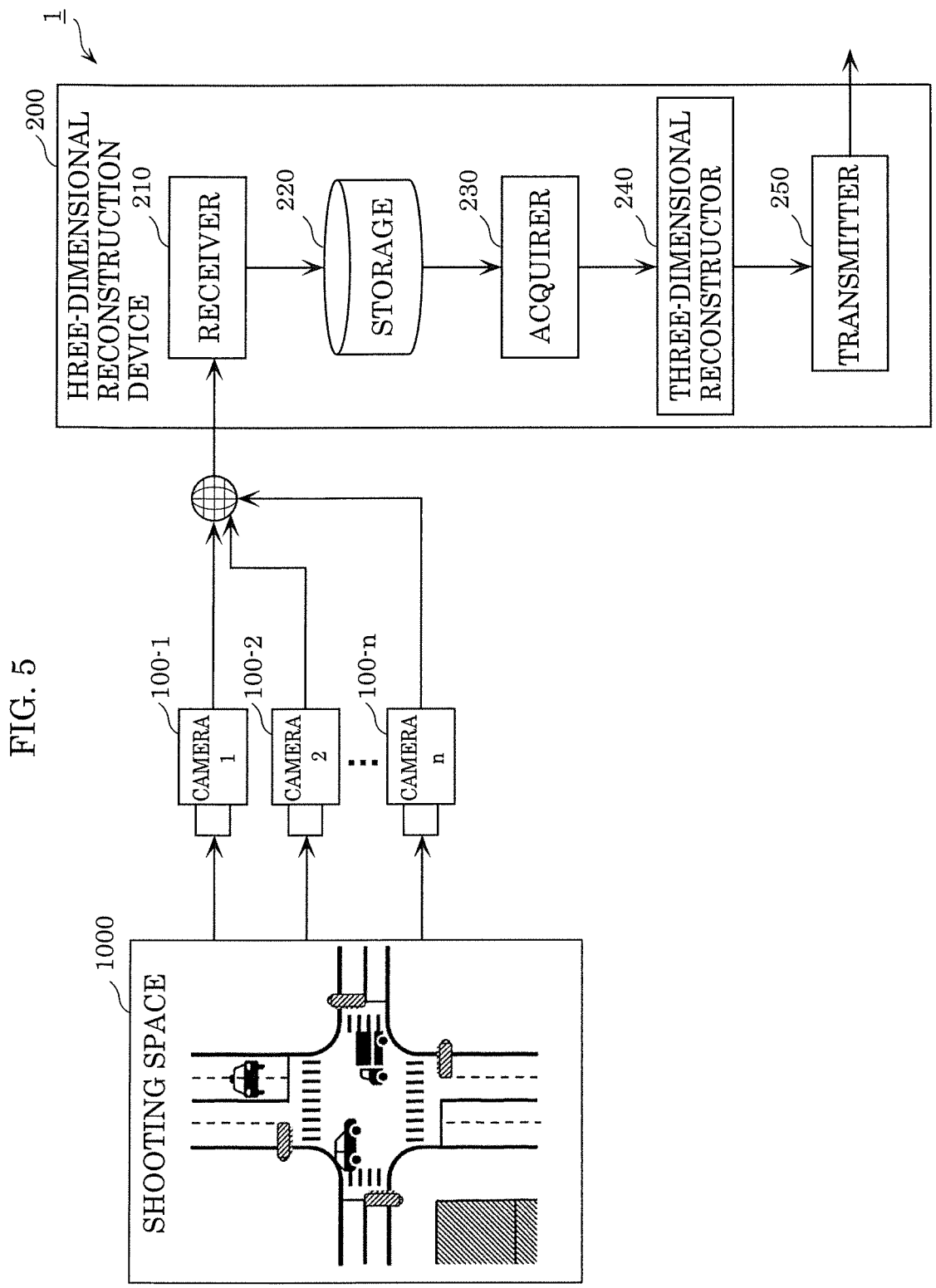
FIG. 5 is a block diagram illustrating an example of a three-dimensional reconstruction system according to an embodiment.

Next, a configuration of the three-dimensional reconstruction system according to the present embodiment will be described. FIG. 5 is a block diagram illustrating an example of the three-dimensional reconstruction system according to the present embodiment. Three-dimensional reconstruction system 1 illustrated in FIG. 5 includes a plurality of cameras 100-1 to 100-$n$ and three-dimensional reconstruction device 200.

The plurality of cameras 100-1 to 100-$n$ shoot an object and output a multi-viewpoint videos including a plurality of videos shot by the plurality of cameras 100-1 to 100-$n$. The multi-viewpoint video may be transmitted via a public communication network, such as the internet, or a dedicated communication network. The plurality of cameras 100-1 to 100-$n$ are examples of a plurality of image capturing devices. Alternatively, the multi-viewpoint video may once be stored in an external storage device, such as a hard disk drive (HDD) or a solid state drive (SSD), and input to three-dimensional reconstruction device 200 as necessary. Alternatively, the multi-viewpoint video is transmitted to an external storage device, such as a cloud server, via a network and stored in the external storage device. Then, the multi-viewpoint video may be transmitted to three-dimensional reconstruction device 200 as necessary.

Each of n cameras 100-1 to 100-$n$ is a stationary camera, such as a monitoring camera. In other words, n cameras 100-1 to 100-$n$ are stationary cameras fixed at different positions and with different postures, for example. Herein, n is an integer greater than or equal to 2. Not all of n cameras 100-1 to 100-$n$ need to be stationary cameras, and n cameras 100-1 to 100-$n$ may include a non-stationary camera that is not fixed and can be moved.

Camera identification information, such as camera IDs, for identifying the cameras that have shot the multi-viewpoint video may be appended to the multi-viewpoint video in the form of header information of the video or the frames.

Synchronous shooting of shooting an object at the same time in every frame may be performed with the use of the plurality of cameras 100-1 to 100-$n$. Alternatively, the clocks embedded in the plurality of cameras 100-1 to 100-$n$ may be synchronized. Then, instead of performing synchronous shooting, shooting time information may be appended to each video or each frame, or an index number indicating the shooting order may be appended to each video or each frame.

Information indicating whether synchronous shooting has been performed or asynchronous shooting has been performed may be added in the form of header information to each set of videos, each video, or each frame of the multi-viewpoint video.

Three-dimensional reconstruction device 200 includes receiver 210, storage 220, acquirer 230, three-dimensional reconstructor 240, and transmitter 250.

Figure 6:
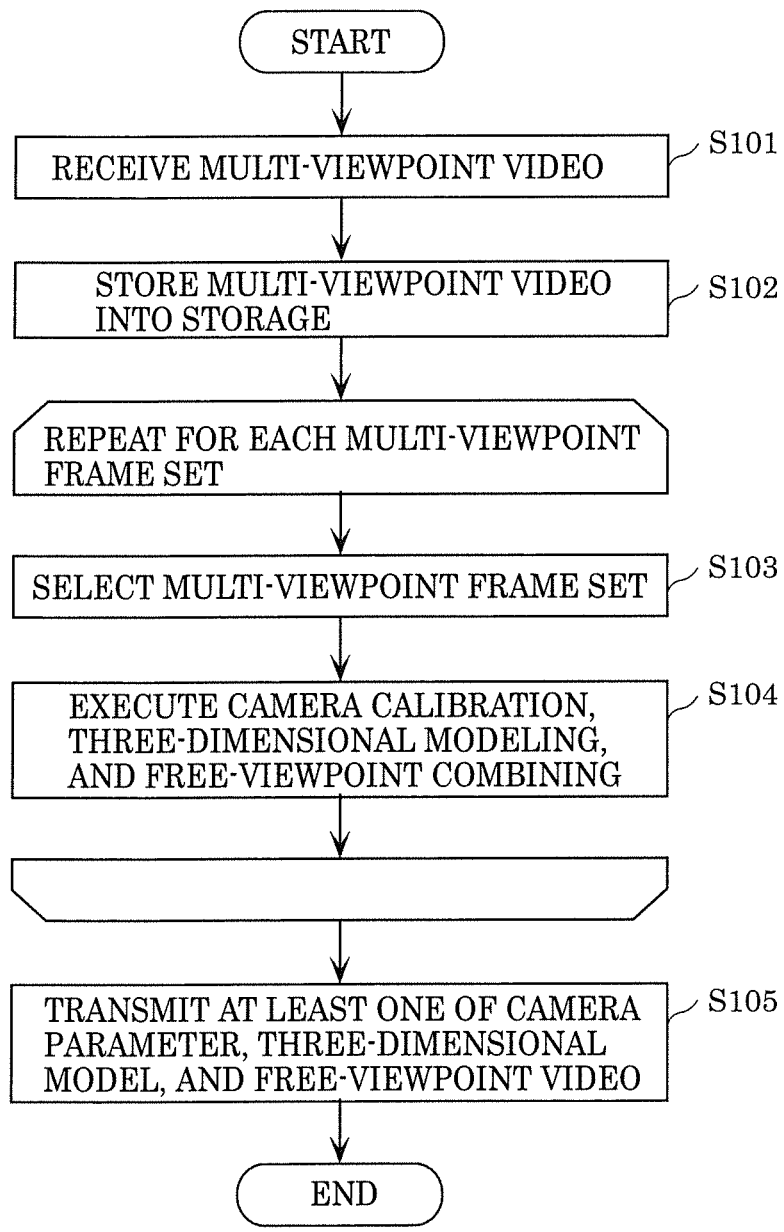
FIG. 6 is a flowchart illustrating an example of a process performed by a three-dimensional reconstruction device according to an embodiment.

Next, an operation of three-dimensional reconstruction device 200 will be described. FIG. 6 is a flowchart illustrating an example of an operation of three-dimensional reconstruction device 200 according to the present embodiment.

First, receiver 210 receives a multi-viewpoint video shot by the plurality of cameras 100-1 to 100-$n$ (S101). Storage 220 stores the received multi-viewpoint video (S102).

Next, acquirer 230 selects frames from the multi-viewpoint video and outputs the selected frames to three-dimensional reconstructor 240 as a multi-viewpoint frame set (S103).

For example, the multi-viewpoint frame set may include a plurality of frames including one frame selected from each of the videos shot from different viewpoints. Alternatively, the multi-viewpoint frame set may include a plurality of frames including at least one frame selected from each of the videos shot from different viewpoints. Alternatively, two or more videos shot from different viewpoints may be selected from the multi-viewpoint video, and the multi-viewpoint frame set may include a plurality of frames including one frame selected from each of the selected videos. Alternatively, two or more videos shot from different viewpoints may be selected from the multi-viewpoint video, and the multi-viewpoint frame set may include a plurality of frames including at least one frame selected from each of the selected videos.

When the camera identification information is not appended to each of the frames in the multi-viewpoint frame set, acquirer 230 may individually append the camera identification information to the header information of each frame or may collectively append the camera identification information to the header information of the multi-viewpoint frame set.

When the shooting time or the index number indicating the shooting order is not appended to each of the frames in the multi-viewpoint frame set, acquirer 230 may individually append the shooting time or the index number to the header information of each frame or may collectively append the shooting time or the index number to the header information of the multi-viewpoint frame set.

Next, three-dimensional reconstructor 240 generates a three-dimensional model by executing a camera calibration process and a three-dimensional modeling process with the use of the multi-viewpoint frame set (S104).

The processes in steps S103 and S104 are repeated for each multi-viewpoint frame set.

Lastly, transmitter 250 transmits at least one of the camera parameters and the three-dimensional model of the object to an external apparatus (S105).

Figure 7:
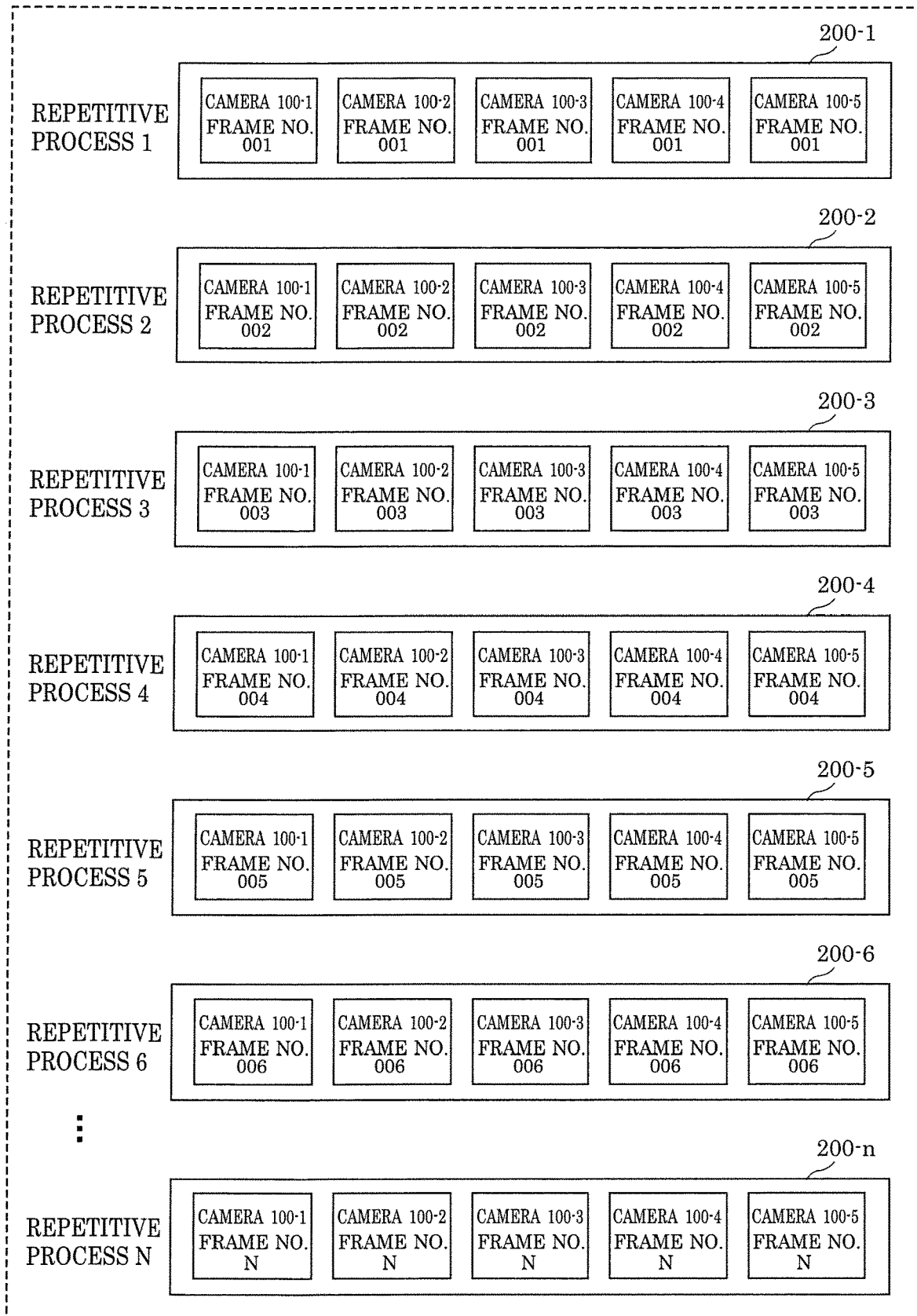
FIG. 7 illustrates an example of a multi-viewpoint frame set according to an embodiment.

Next, details of a multi-viewpoint frame set will be described. FIG. 7 illustrates an example of a multi-viewpoint frame set. In the example described below, acquirer 230 determines a multi-viewpoint frame set by selecting one frame from each of five cameras 100-1 to 100-5.

In addition, an assumption is that the plurality of cameras perform synchronous shooting. The header information of each frame has appended thereto a corresponding one of camera IDs 100-1 to 100-5 for identifying the camera that has shot that frame. The header information of each frame has further appended thereto a corresponding one of frame numbers 001 to N indicating the shooting order in each camera. Frames having the same frame number across the cameras are frames capturing an object shot at the same time.

Acquirer 230 successively outputs multi-viewpoint frame sets 200-1 to 200-$n$ to three-dimensional reconstructor 240. Three-dimensional reconstructor 240 successively performs three-dimensional reconstruction through repetitive processes with the use of multi-viewpoint frame sets 200-1 to 200-$n$.

Multi-viewpoint frame set 200-1 includes five frames including a frame with frame number 001 shot by camera 100-1, a frame with frame number 001 shot by camera 100-2, a frame with frame number 001 shot by camera 100-3, a frame with frame number 001 shot by camera 100-4, and a frame with frame number 001 shot by camera 100-5. Three-dimensional reconstructor 240 uses this multi-viewpoint frame set 200-1 as a first set of frames of the multi-viewpoint video in repetitive process 1 and thus reconstructs a three-dimensional model corresponding to the time when the frames with frame number 001 are shot.

The frame number is updated in multi-viewpoint frame set 200-2 in all of the cameras. Multi-viewpoint frame set 200-2 includes five frames including a frame with frame number 002 shot by camera 100-1, a frame with frame number 002 shot by camera 100-2, a frame with frame number 002 shot by camera 100-3, a frame with frame number 002 shot by camera 100-4, and a frame with frame number 002 shot by camera 100-5. Three-dimensional reconstructor 240 uses this multi-viewpoint frame set 200-2 in repetitive process 2 and thus reconstructs a three-dimensional model corresponding to the time when the frames with frame number 002 are shot.

In repetitive process 3 and thereafter, the frame number is updated in all of the cameras in a similar manner. Thus, three-dimensional reconstructor 240 can reconstruct three-dimensional models corresponding to the respective times.

Herein, since three-dimensional reconstruction is performed independently for each time, the coordinate axes and the scales are not necessarily consistent across the plurality of reconstructed three-dimensional models. In other words, in order to acquire a three-dimensional model of a moving object, the coordinate axes and the scales need to be consistent across the times.

In that case, the shooting time is appended to each frame, and based on that shooting time, acquirer 230 creates a multi-viewpoint frame set that includes a combination of a synchronous frame and an asynchronous frame. Now, a method of determining a synchronous frame and an asynchronous frame with the use of the shooting times of two cameras will be described.

The shooting time of a frame selected from camera 100-1 is denoted as T1, the shooting time of a frame selected from camera 100-2 is denoted as T2, the exposure time of camera 100-1 is denoted as TE1, and the exposure time of camera 100-2 is denoted as TE2. Herein, shooting times T1 and T2 each corresponding to the time at which the exposure starts in the examples illustrated in FIGS. 3 and 4, that is, the time at which the rectangular signal rises.

In this case, the time at which the exposure ends in camera 100-1 falls at T1+TE1. At this time, if Expression 1 or Expression 2 holds, it is determined that the two cameras have shot an object at the same time, that is, at corresponding timings and determined that the two frames are synchronous frames.

$$T1 \leq T2 \leq T1+TE1 \qquad \text{(Expression 1)}$$

$$T1 \leq T2+TE2 \leq T1+TE1 \qquad \text{(Expression 2)}$$

Herein, a frame corresponding to a timing of given time t1 may be a frame shot at a timing included in a period spanning several tens of milliseconds from time t.

Figure 8:
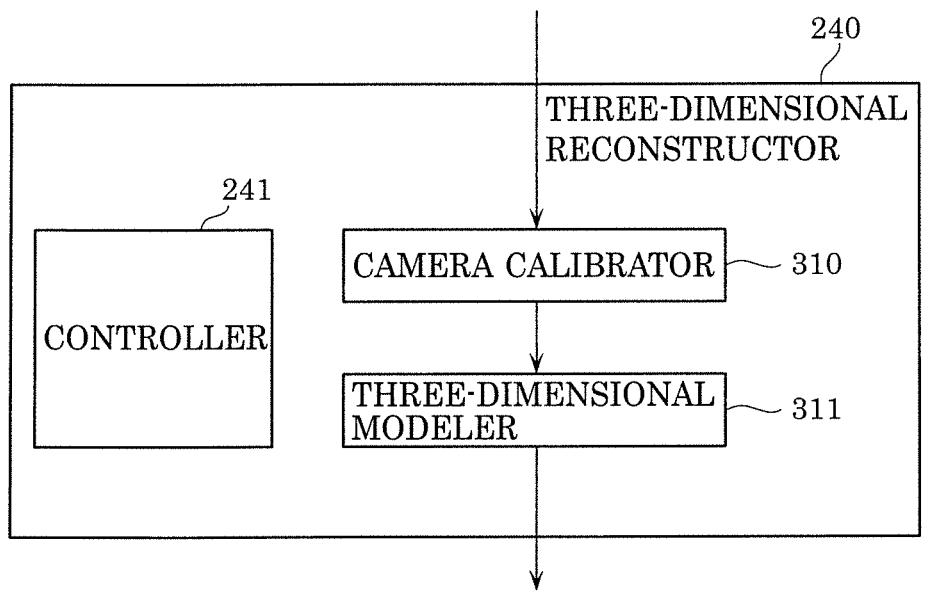
FIG. 8 is a block diagram illustrating an example of a structure of a three-dimensional reconstructor according to an embodiment.

Next, details of three-dimensional reconstructor 240 will be described. FIG. 8 is a block diagram illustrating an example of a structure of three-dimensional reconstructor 240. As illustrated in FIG. 8, three-dimensional reconstructor 240 includes controller 241, camera calibrator 310, and three-dimensional modeler 311.

Controller 241 determines the number of viewpoints that is optimal in each process performed by camera calibrator 310 and three-dimensional modeler 311. The number of viewpoints to be determined in this case is the number of different viewpoints.

Controller 241 sets the number of viewpoints of a multi-viewpoint frame set used in a three-dimensional modeling process of three-dimensional modeler 311 to the same number as the number of n cameras 100-1 to 100-*n*, that is, sets the number of viewpoints to n, for example. Then, based on the number of viewpoints n in the three-dimensional modeling process, controller 241 determines the number of viewpoints of a multi-viewpoint frame set to be used in another process, that is, in a camera calibration process.

Figure 9:
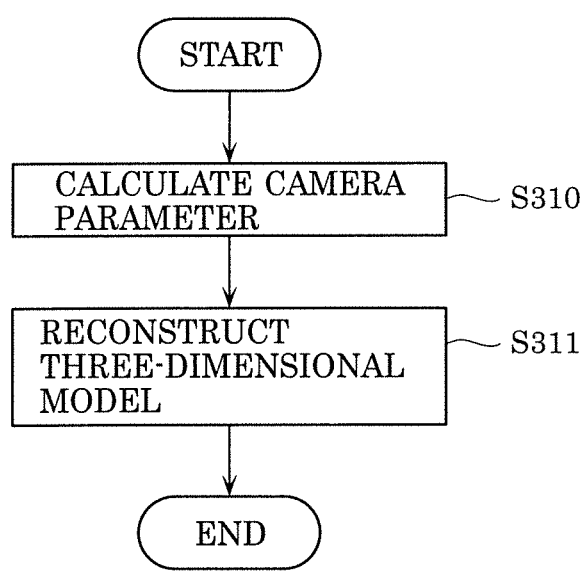
FIG. 9 is a flowchart illustrating an example of an operation of a three-dimensional reconstructor according to an embodiment.

FIG. 9 is a flowchart illustrating an example of an operation of three-dimensional reconstructor 240. In the process illustrated in FIG. 9, a multi-viewpoint frame set with viewpoints in the number determined by controller 241 is used.

First, camera calibrator 310 calculates the camera parameters of the plurality of cameras 100-1 to 100-*n* with the use of the n frames shot from the n different viewpoints by n cameras 100-1 to 100-*n* disposed at different positions (S310). The n viewpoints in this example are based on the number of viewpoints determined by controller 241.

Specifically, camera calibrator 310 calculates, as the camera parameters, the intrinsic parameters, the extrinsic parameters, and the lens distortion coefficient of each of the plurality of cameras 100-1 to 100-*n*. The intrinsic parameters indicate the characteristics of the optical system, such as the focal length of the camera, the aberration, and the image center. The extrinsic parameters indicate the position and the posture of the camera in the three-dimensional space.

Camera calibrator 310 may calculate the intrinsic parameters, the extrinsic parameters, and the lens distortion coefficient separately with the use of the n frames obtained as the plurality of cameras 100-1 to 100-*n* shoot a black and white intersection on a checkerboard. Alternatively, camera calibrator 310 may calculate the intrinsic parameters, the extrinsic parameters, and the lens distortion coefficient collectively with the use of correspondence points between the n frames, as in the Structure from Motion technique, and may then perform total optimization. In the latter case, the n frames do not need to be images containing a checkerboard.

Camera calibrator 310 performs the camera calibration process with the use of the n frames obtained by n cameras 100-1 to 100-*n*. In the camera calibration process, the distance between the cameras is shorter as the number of cameras is greater, and a plurality of cameras closer to each other have the fields of view that are closer to each other. This makes it easier to map a plurality of frames obtained by a plurality of cameras that are close to each other.

In the three-dimensional reconstruction process of three-dimensional reconstructor 240, camera calibrator 310 does not always need to perform the camera calibration process in step S310 and may perform the camera calibration process once in every predetermined times the three-dimensional reconstruction process is performed.

Next, three-dimensional modeler 311 reconstructs an object in shooting space 1000 into a three-dimensional model including a three-dimensional point cloud, or a collection of three-dimensional points, with the use of the n frames captured by n respective cameras 100-1 to 100-*n* and the camera parameters obtained in the camera calibration process (S311). The n frames used in the three-dimensional modeling process are images captured by n respective cameras 100-1 to 100-*n* at a given timing. In other words, the multi-viewpoint frame set of the n viewpoints including the n frames is a multi-viewpoint frame set obtained through synchronous shooting.

Figure 10:
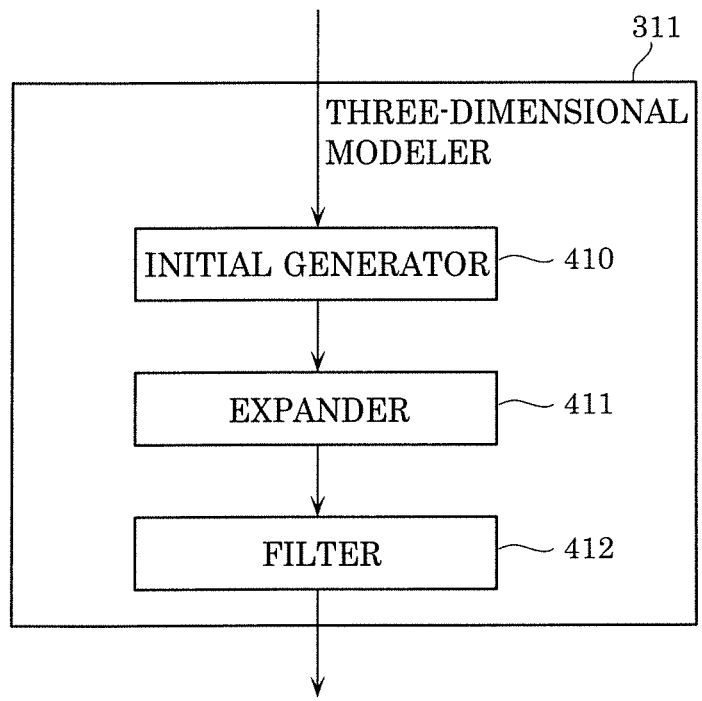
FIG. 10 is a block diagram illustrating an example of a structure of a three-dimensional modeler.
Figure 11:
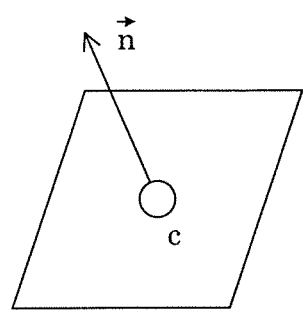
FIG. 11 is an illustration for describing a three-dimensional patch.
Figure 12:
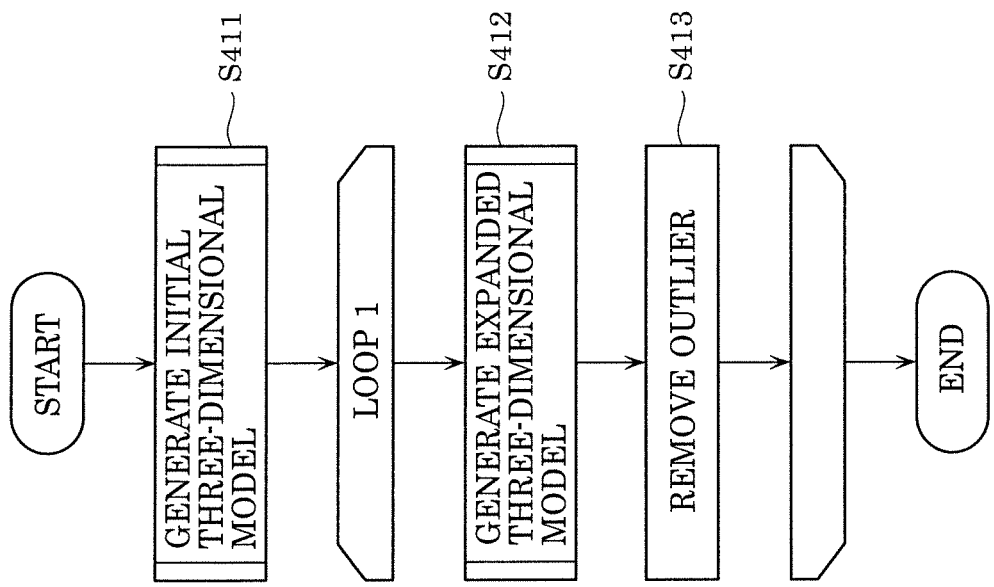
FIG. 12 is a flowchart illustrating an example of an operation of a three-dimensional modeler.

Next, with reference to FIGS. 10 to 12, details of three-dimensional modeler 311 will be described. FIG. 10 is a block diagram illustrating an example of a structure of three-dimensional modeler 311. FIG. 11 is an illustration for describing a three-dimensional patch. FIG. 12 is a flowchart illustrating an example of an operation of three-dimensional modeler 311.

Herein, each block of three-dimensional modeler 311 will be described with reference to FIG. 10, and the flow of the processes performed in the blocks will be described with reference to FIG. 12.

Three-dimensional modeler 311 includes initial generator 410, expander 411, and filter 412.

Initial generator 410 performs first generating of generating an initial three-dimensional model including a sparse three-dimensional point cloud by mapping feature points between frames (S411). The process of mapping the feature points between the frames is also referred to as a matching. In this manner, initial generator 410 generates a plurality of three-dimensional points by matching a plurality of feature points included in each of a plurality of frames between the plurality of frames. Thus, initial generator 410 generates the initial three-dimensional model including the sparse three-dimensional point cloud that includes the plurality of generated three-dimensional points. Initial generator 410 generates, as the plurality of three-dimensional points, a plurality of three-dimensional patches that each indicate the three-dimensional position of a point on the surface of the object and the normal direction of that point perpendicular to the surface. The sparse three-dimensional point cloud is an example of a first three-dimensional point cloud.

Each of the plurality of three-dimensional points may include its three-dimensional position, its normal direction, a visible frame in which the three-dimensional point is visible, and a projection point (two-dimensional point) of the three-dimensional point projected onto the visible frame. Each of the plurality of three-dimensional patches may be expressed by a three-dimensional vector having the normal direction and the three-dimensional position defined by the x coordinate, the y coordinate, and the z coordinate. As illustrated in FIG. 11, specifically, a three-dimensional patch may be approximated by a small plane centered on small region c of the surface of the object at three-dimensional position c with three-dimensional position c serving as a reference and may be expressed as an orientation within the three-dimensional space in the form of a vector indicating the normal to the small plane.

The detailed process of the first generating in step S411 will be described later with reference to FIGS. 13 to 23.

Next, three-dimensional modeler 311 repeats loop 1 desired times. In loop 1, step S412 and step S413 are performed.

Expander 411 generates an expanded three-dimensional model including a dense three-dimensional point cloud by expanding the sparse three-dimensional point cloud composing the initial three-dimensional model and increasing the number of three-dimensional points (S412). Expander 411 performs second generating of generating a new three-dimensional point with the use of the plurality of frames and the three-dimensional point cloud of the initial three-dimensional model generated in the first generating and adding the generated three-dimensional point to the three-dimensional point cloud of the initial three-dimensional model. The dense three-dimensional point cloud is an example of a second three-dimensional point cloud.

The detailed process of the second generating in step S412 will be described later with reference to FIGS. 24 to 35.

Thereafter, filter 412 removes, through a predetermined method, any outlier from the dense three-dimensional point cloud composing the expanded three-dimensional model generated by expander 411 (S413).

Thus, three-dimensional modeler 311 outputs a three-dimensional model from which any outlier has been removed. In this manner, the three-dimensional model is reconstructed by three-dimensional modeler 311.

Next, the detailed process of the first generating will be described with reference to FIGS. 13 to 23.

Figure 13:
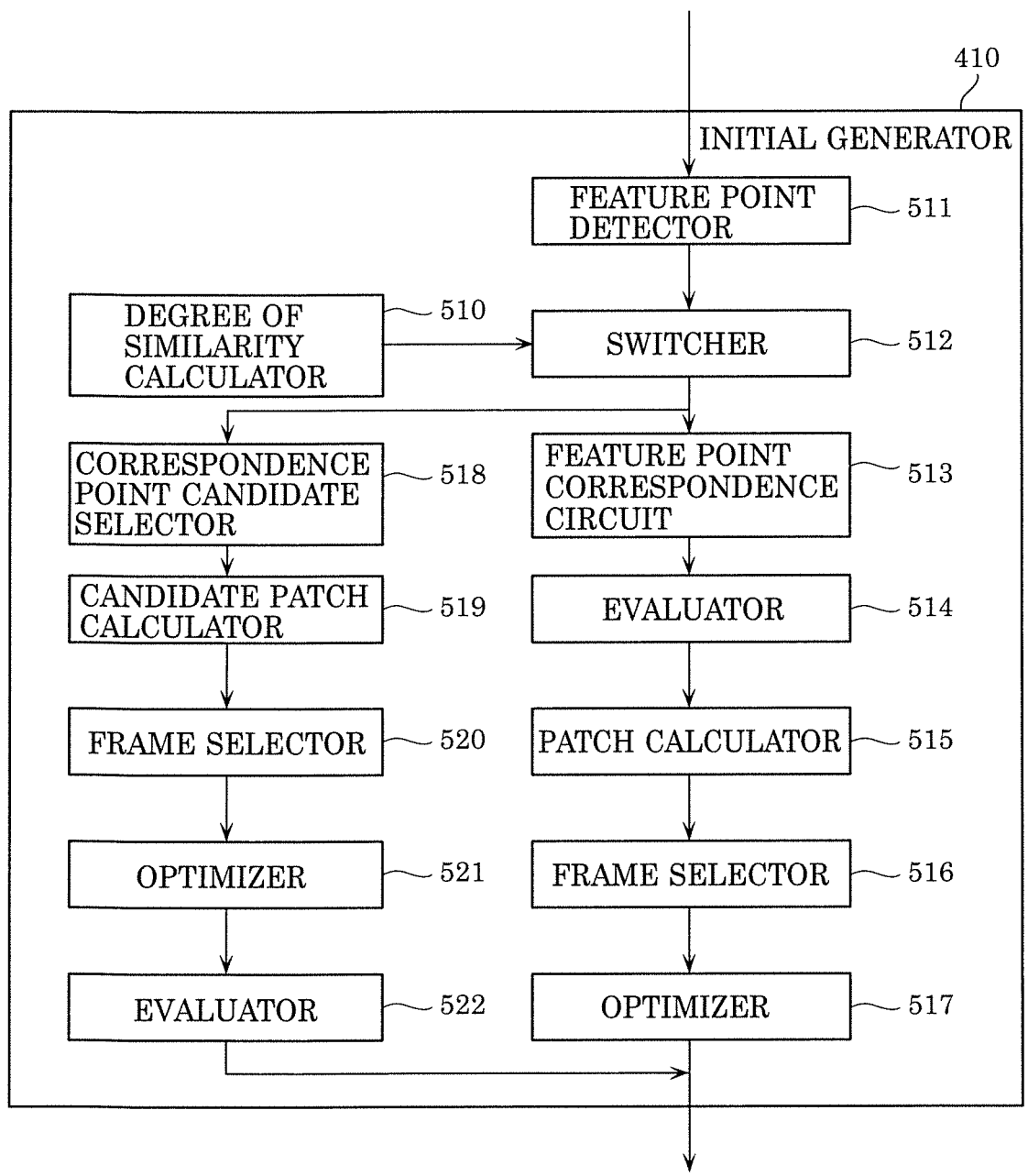
FIG. 13 is a block diagram illustrating an example of a structure of an initial generator.
Figure 14:
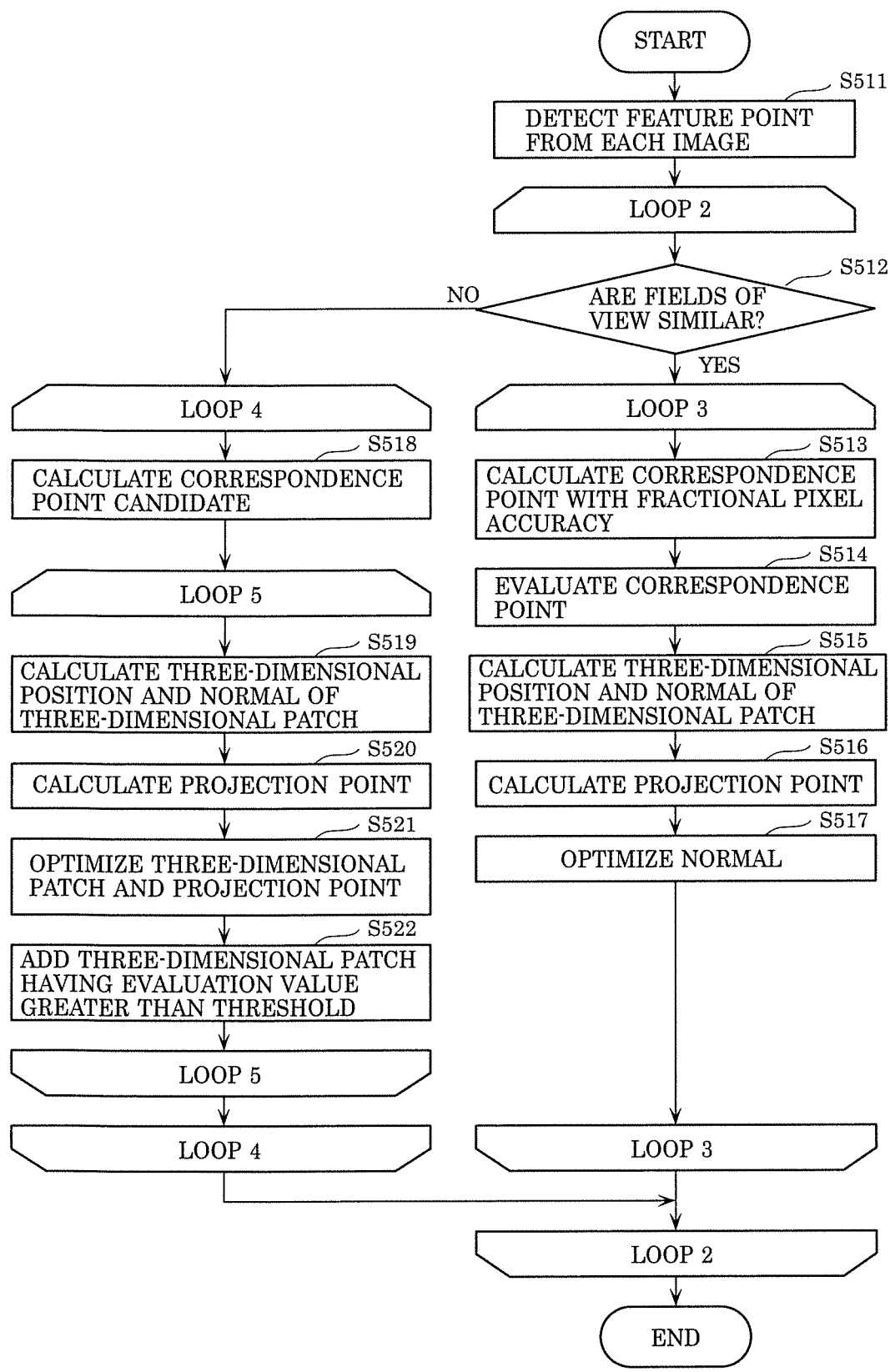
FIG. 14 is a flowchart illustrating an example of an operation of an initial generator.

FIG. 13 is a block diagram illustrating an example of a structure of initial generator 410. FIG. 14 is a flowchart illustrating an example of an operation of initial generator 410.

Herein, each block of initial generator 410 will be described with reference to FIG. 13, and the flow of the processes performed in the blocks will be described with reference to FIG. 14.

Initial generator 410 includes degree of similarity calculator 510, feature point detector 511, switcher 512, feature point correspondence circuit 513, evaluator 514, patch calculator 515, frame selector 516, optimizer 517, correspondence point candidate selector 518, candidate patch calculator 519, frame selector 520, optimizer 521, and evaluator 522.

In the first generating, first, feature point detector 511 detects feature points from each of the n frames captured by n respective cameras 100-1 to 100-$n$ (S511). The feature points detected from each of the n frames may be temporarily stored in a memory (not illustrated).

Next, loop 2 of repeating the processes in steps S512 to S522 is performed for each of the n frames captured at corresponding timings. Specifically, in loop 2, one frame is selected from the n frames to serve as a reference frame, the selected reference frame is paired with each of the (n−1) frames of the n frames excluding the reference frame to generate a plurality of pairs of frames, and loop 2 is executed for each of the plurality of generated pairs of frames. In other words, loop 2 is executed for each of all the possible pairs of frames that can be formed when any two frames are selected from the n frames. Loop 2 is an example of a first loop.

Switcher 512 determines whether the fields of view of the two cameras that have captured the respective frames in a pair to be processed are similar to each other (S512). Herein, as the degree of similarity between the fields of view of two cameras used in this determination is greater, the two fields of view are more similar to each other. Alternatively, in the calculation of the degree of similarity, an index indicating that the two fields of view are more similar as the value of the index is smaller may be used. In this case, the reciprocal of this index may be used for the degree of similarity, for example. Alternatively, in the calculation of the degree of similarity, an index indicating that the two fields of view are more similar as the value of the index is closer to 1 may be used. In this case, for example, if the index is smaller than 1 a value obtained by multiplying the index by 100 may be used for the degree of similarity. If the index is greater than 1, a value obtained by multiplying the reciprocal of the index by 100 may be used. The degree of similarity is calculated by degree of similarity calculator 510.

Figure 15A:
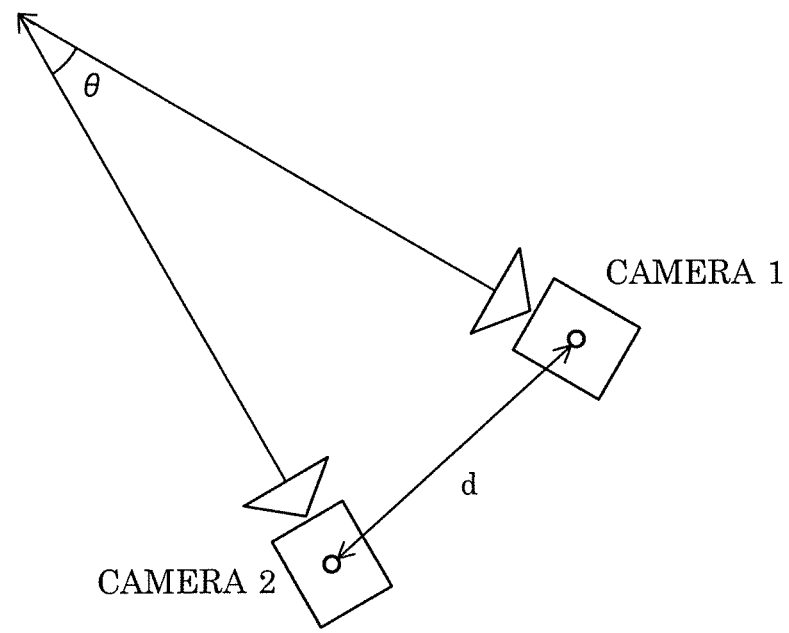
FIG. 15A is an illustration for describing an index to be used for the degree of similarity between the fields of view of two cameras.
Figure 15B:
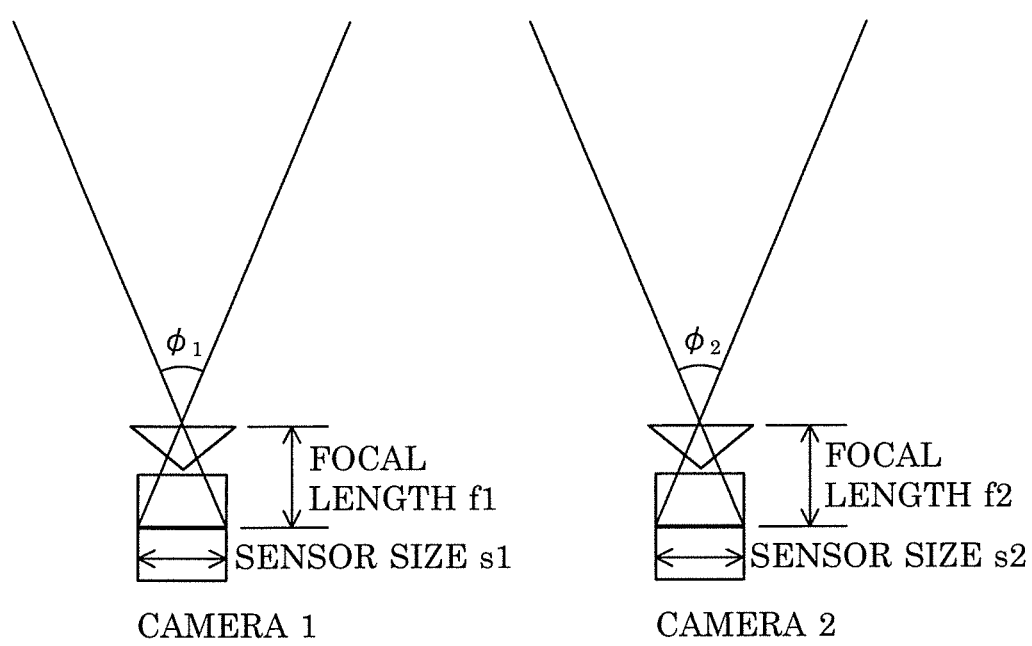
FIG. 15B is another illustration for describing an index to be used for the degree of similarity between the fields of view of two cameras.

The degree of similarity between the fields of view of two cameras will be described with reference to FIGS. 15A and 15B. FIGS. 15A and 15B are each an illustration for describing an index to be used for the degree of similarity between the fields of view of two cameras.

As illustrated in FIG. 15A, the index to be used for the degree of similarity between the fields of view of two cameras may be angle of convergence $\theta$, which is an angle formed by the two optical axes of the two respective cameras. Note that an optical axis and a view direction from a viewpoint are parallel. Alternatively, the index to be used for the degree of similarity between the fields of view of two cameras may be distance d between the two cameras. Each of angle of convergence $\theta$ and distance d can be used as the index that indicates that the two fields of view are more similar to each other as the value of the index is smaller.

Furthermore, as illustrated in FIG. 15B, the index to be used for the degree of similarity between the fields of view of two cameras may be first ratio $\varphi1/\varphi2$ of angles of view $\varphi1$ and $\varphi2$ of the two respective cameras. Alternatively, the index to be used for the degree of similarity between the fields of view of two cameras may be second ratio $s1/s2$ of sensor sizes $s1$ and $s2$ of the two respective cameras. Alternatively, the index to be used for the degree of similarity between the fields of view of two cameras may be third ratio f1/f2 of focal lengths f1 and f2 of the two respective cameras. Each of first ratio φ1/φ2, second ratio s1/s2, and third ratio f1/f2 can be used as the index that indicates that the two fields of view are more similar to each other as the value of the index is closer to 1.

In this manner, the degree of similarity between the fields of view of two cameras can be calculated with the use of the camera parameters of the two cameras.

Alternatively, the degree of similarity between the fields of view of two cameras may be indicated by a combination of angle of convergence θ, distance d, and ratio φ1/φ2. When the degree of similarity between the fields of view of two cameras is to be calculated through a combination of a plurality of indices, this degree of similarity may be a value obtained by converting each index to a value that indicates that the two fields of view are more similar to each other as the value is greater and by performing weighted addition of the converted values.

For example, switcher 512 determines that the fields of view of the two cameras are similar to each other when the degree of similarity between the fields of view of the two cameras is higher than or equal to a predetermined threshold. Meanwhile, switcher 512 determines that the fields of view of the two cameras are not similar to each other when the degree of similarity is lower than the predetermined threshold. In the following, a pair of frames obtained by two cameras having respective fields of view with a degree of similarity higher than or equal to the predetermined threshold is referred to as a first pair, and a pair of frames obtained by two cameras having respective fields of view with a degree of similarity lower than the predetermined threshold is referred to as a second pair.

When it is determined in step S512 that the fields of view of the two cameras are similar to each other, loop 3 is executed. Loop 3 is executed for each of a plurality of first pairs. The process of loop 3 is an example of a process of performing, between two or more first frames, a first matching on a plurality of feature points in each of the two or more first frames and generating one or more first three-dimensional points based on the obtained first matching result. The two or more first frames are frames selected from the n frames and obtained by two or more respective first cameras, of the plurality of cameras 100-1 to 100-n, having respective fields of view with a degree of similarity higher than or equal to the predetermined threshold. A first camera is an example of a first image capturing device, and a first frame is an example of a first image.

Meanwhile, when it is determined in step S512 that the fields of view of the two cameras are not similar to each other, loop 4 is executed. Loop 4 is executed for each of a plurality of second pairs. The process of loop 4 is an example of a process of performing, between two or more second frames, a second matching with an accuracy lower than an accuracy of the first matching on a plurality of feature points in each of the two or more second frames and generating one or more second three-dimensional points based on the obtained second matching result. The two or more second frames are frames selected from the n frames and obtained by two or more respective second cameras, of the plurality of cameras 100-1 to 100-n, having respective fields of view with a degree of similarity lower than the predetermined threshold. A second camera is an example of a second image capturing device, and a second frame is an example of a second image.

Figure 16:
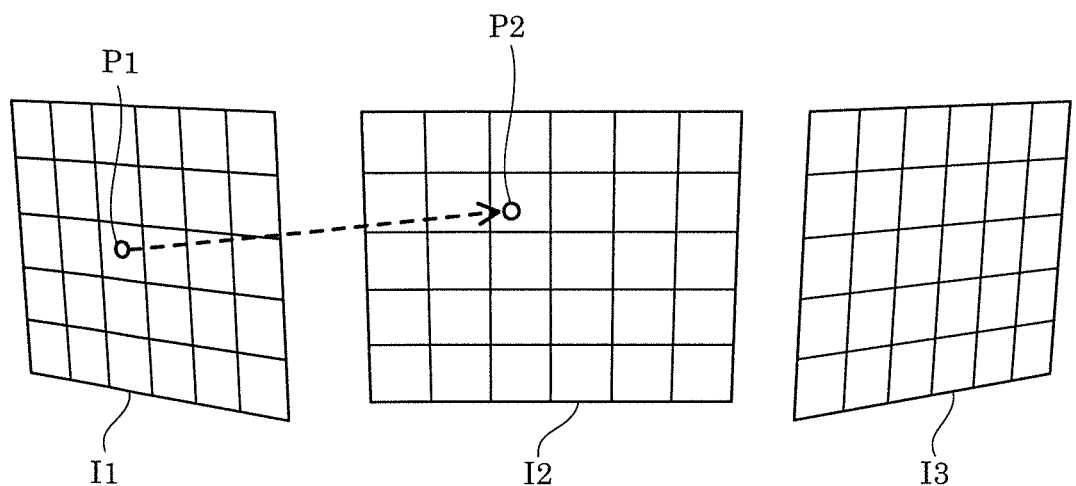
FIG. 16 is an illustration for describing a process performed by a feature point correspondence circuit.
Figure 17:
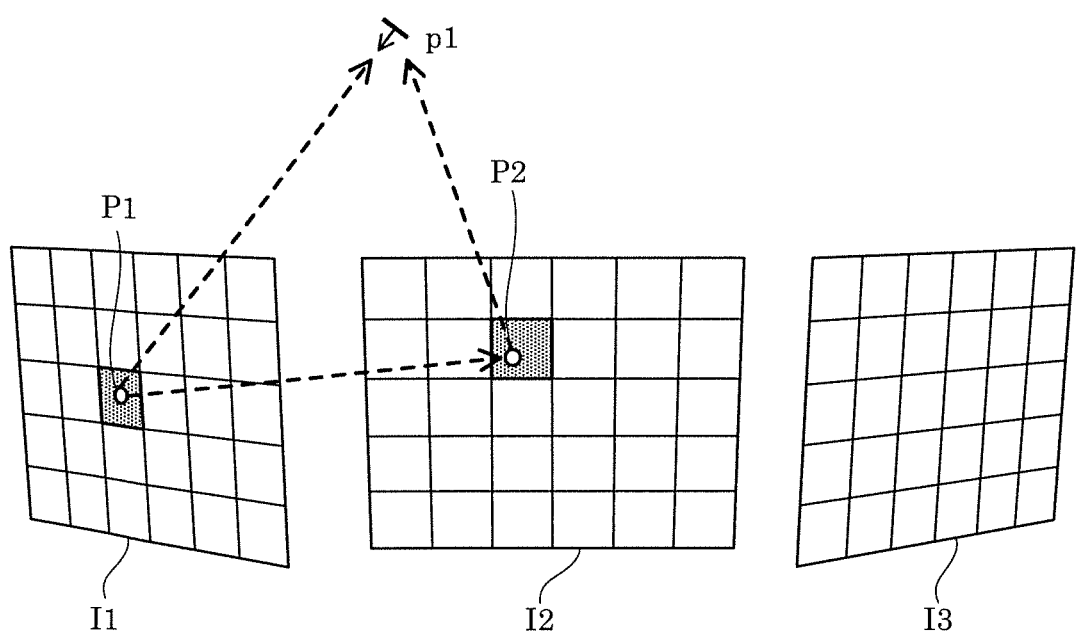
FIG. 17 is an illustration for describing a process performed by a patch calculator.
Figure 18:
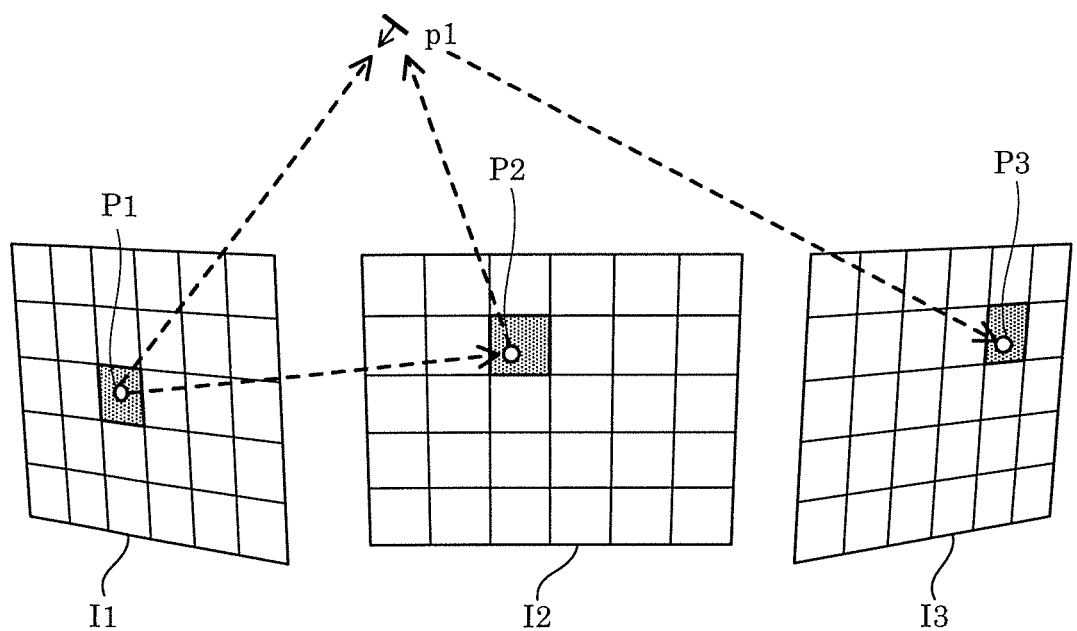
FIG. 18 is an illustration for describing a process performed by a frame selector.
Figure 19:
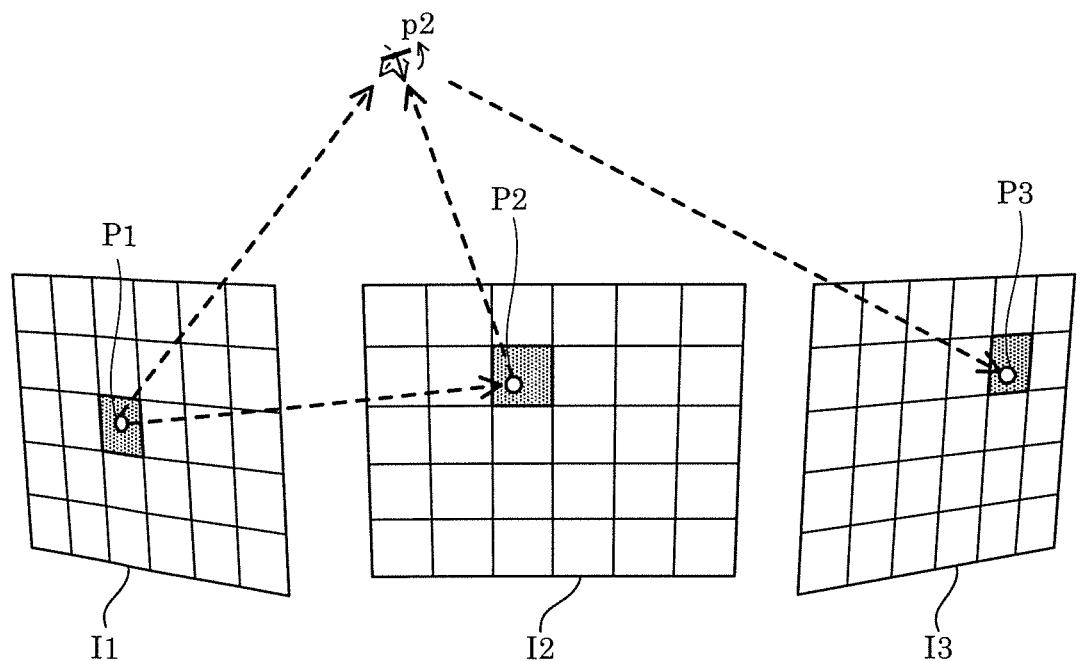
FIG. 19 is an illustration for describing a process performed by an optimizer.

Now, a specific example of loop 3 will be described with reference to FIGS. 16 to 19. FIG. 16 is an illustration for describing a process performed by feature point correspondence circuit 513. FIG. 17 is an illustration for describing a process performed by patch calculator 515. FIG. 18 is an illustration for describing a process performed by frame selector 516. FIG. 19 is an illustration for describing a process performed by optimizer 517.

Loop 3 is performed for each of a plurality of feature points included in a reference frame, or one of the two frames of a first pair to be processed, and steps S513 to S517 are performed in loop 3. Loop 3 is an example of a second loop. The plurality of feature points used in loop 3 are the plurality of feature points detected by feature point detector 511 from each of the n frames.

As illustrated in FIG. 16, in step S513, feature point correspondence circuit 513 calculates, with fractional pixel accuracy, correspondence point P2 that corresponds to feature point P1 to be processed from the other one of the two frames of the first pair to be processed (i.e., from frame I2 different from reference frame I1) (S513). Feature point correspondence circuit 513 calculates correspondence point P2 that corresponds to feature point P1 in reference frame I1 from frame I2 by performing the first matching with high fractional pixel accuracy, as in the phase-only correlation method described in Takita et al. (2004), for example. Correspondence point P2 is an example of a first correspondence point.

In step S514, evaluator 514 evaluates correspondence point P2 calculated by feature point correspondence circuit 513 (S514). Evaluator 514 determines whether an evaluation value obtained through the evaluation is greater than or equal to a first evaluation value. When the evaluation value is greater than or equal to the first evaluation value, evaluator 514 determines to add, to a three-dimensional point cloud, a three-dimensional patch to be calculated later by patch calculator 515 with the use of correspondence point P2. In this case, step S515 that follows is executed thereafter. Meanwhile, when the evaluation value is less than the first evaluation value, steps S513 to S517 are executed for the next feature point without executing the processes in steps S515 to S517 that follow. Specifically, evaluator 514 calculates a peak value of an evaluation function of the phase-only correlation method as the evaluation value.

As illustrated in FIG. 17, in step S515, patch calculator 515 calculates the three-dimensional position of three-dimensional patch p1 through triangulation with the use of feature point P1 to be processed, correspondence point P2 calculated by feature point correspondence circuit 513, the camera parameters of the camera that has obtained reference frame I1, and the camera parameters of the camera that has obtained frame I2 (S515). Patch calculator 515 temporarily determines that the direction parallel to the straight line connecting the three-dimensional position of the camera that has obtained reference frame I1 and the three-dimensional position of three-dimensional patch p1 as a tentative normal direction of three-dimensional patch p1. A camera that obtains frame I1 is an example of a third image capturing device. A camera that obtains frame I2 is an example of a fourth image capturing device. Three-dimensional patch p1 calculated in the above process is an example of a first three-dimensional patch.

As illustrated in FIG. 18, in step S516, frame selector 516 identifies one or more first visible frames I3 capturing three-dimensional patch p1 calculated by patch calculator 515 from a plurality of frames included in a plurality of first frames excluding frames I1 and I2 of the first pair to be processed. Then, for each of identified one or more first visible frames I3, frame selector 516 calculates projection point P3, which is a two-dimensional point in first visible frame I3, by projecting three-dimensional patch p1 with the use of the camera parameters of the camera that has obtained first visible frame I3 (S516). While FIG. 18 illustrates one first visible frame I3, there may be a case where a plurality of first visible frames I3 are identified. In that case, projection point P3 is calculated for each of the plurality of first visible frames I3. First visible frame I3 is an example of a first visible image. A camera that obtains first visible frame I3 is an example of a fifth image capturing device. Projection point P3 is an example of a first two-dimensional point.

As illustrated in FIG. 19, in step S517, optimizer 517 corrects the normal direction of three-dimensional patch p1 such that the evaluation value indicating the projection consistency is minimized with the use of three-dimensional patch p1 calculated by patch calculator 515 and one or more projection points P3 calculated by frame selector 516 and generates corrected three-dimensional patch p2 as a first three-dimensional point (S517). Specifically, optimizer 517 optimizes the normal direction of three-dimensional patch p1, the position of correspondence point P2 in frame I2, and the position of projection point P3 in first visible frame I3 while keeping the position of feature point P1 in reference frame I1 and the three-dimensional position of three-dimensional patch p1 fixed. For example, optimizer 517 performs a calculation through Expression 3 to calculate, as N(I,J,p), the normalized cross-correlation (NCC) of small regions around feature points in pairs where reference frame I1 is paired with frame I2 and each of one or more first visible frames I3. Then, the total value of the calculated NCC is used as the evaluation value indicating the projection consistency of three-dimensional patch p2 onto a visible camera. A visible camera is a camera that obtains frame I2 and each of one or more first visible frames I3 and that captures three-dimensional patch p2.

$$N(I, J, p) = \frac{\sum (I_{xy} - \overline{I_{xy}}) \cdot (J_{xy} - \overline{J_{xy}})}{\sqrt{(I_{xy} - \overline{I_{xy}})^2} \sqrt{(J_{xy} - \overline{J_{xy}})^2}}$$ (Expression 3)

$I_{xy}$ and $J_{xy}$ each represent a pixel value of a pixel in small region of each frame.

$\overline{I_{xy}}$ and $\overline{J_{xy}}$ each represent an average of the pixels in the small region of each frame.

Thus, calculated three-dimensional patch p2 includes the three-dimensional position, the normal direction, and visible frame information indicating frame 2 and one or more first visible frame I3, or visible frames capturing three-dimensional patch p2. Calculated three-dimensional patch p2 is stored into a memory as a first three-dimensional point.

In loop 3 in the first generating, the three-dimensional position of a three-dimensional point is calculated with the use of the first matching of matching feature points with high accuracy for two frames in a first pair obtained by two cameras having respective fields of view with a degree of similarity higher than or equal to a predetermined threshold. Therefore, any error in the three-dimensional position can be reduced. In addition, an error present when optimizer 517 starts the process is small, and the number of parameters can be reduced. Therefore, the conversion through optimization can be accelerated, and the processing time can be shortened.

Figure 20:
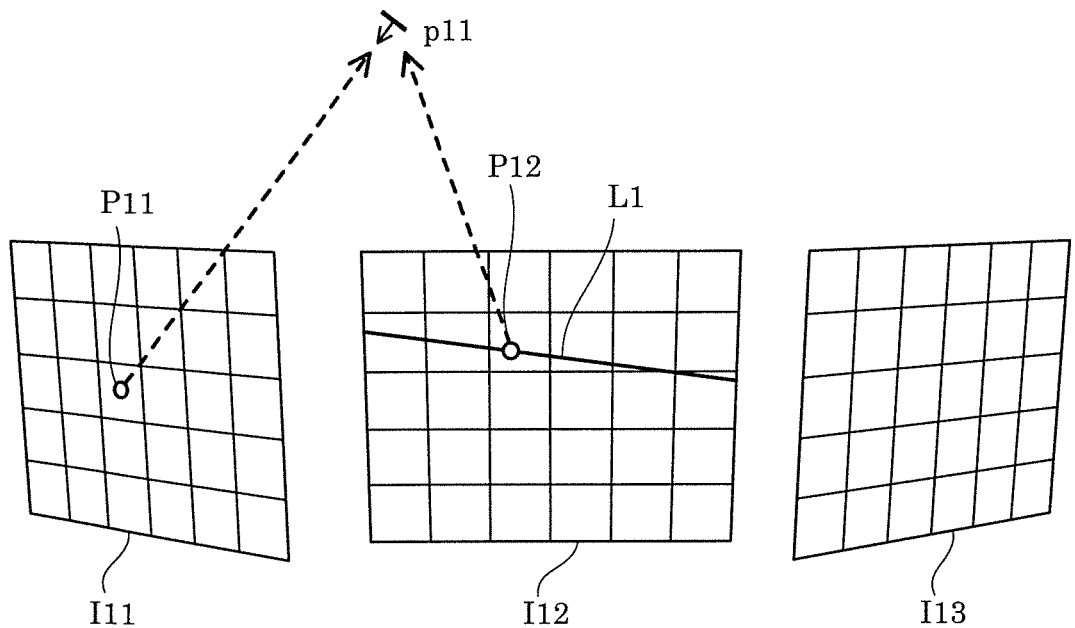
FIG. 20 is an illustration for describing a process performed by a correspondence point candidate selector and a candidate patch calculator.
Figure 21:
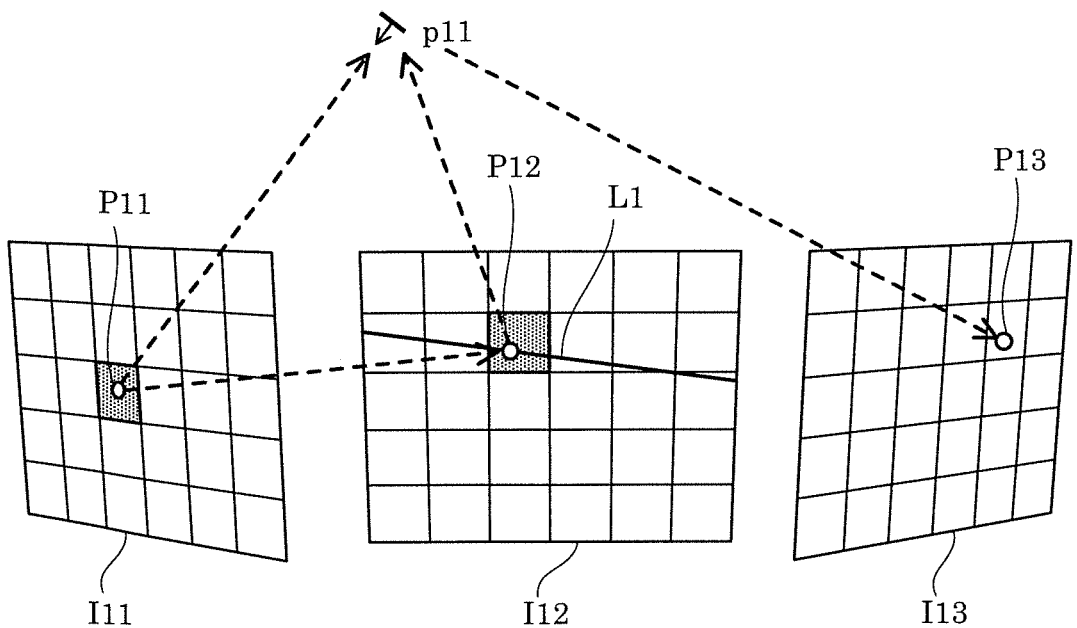
FIG. 21 is an illustration for describing a process performed by a frame selector.
Figure 22:
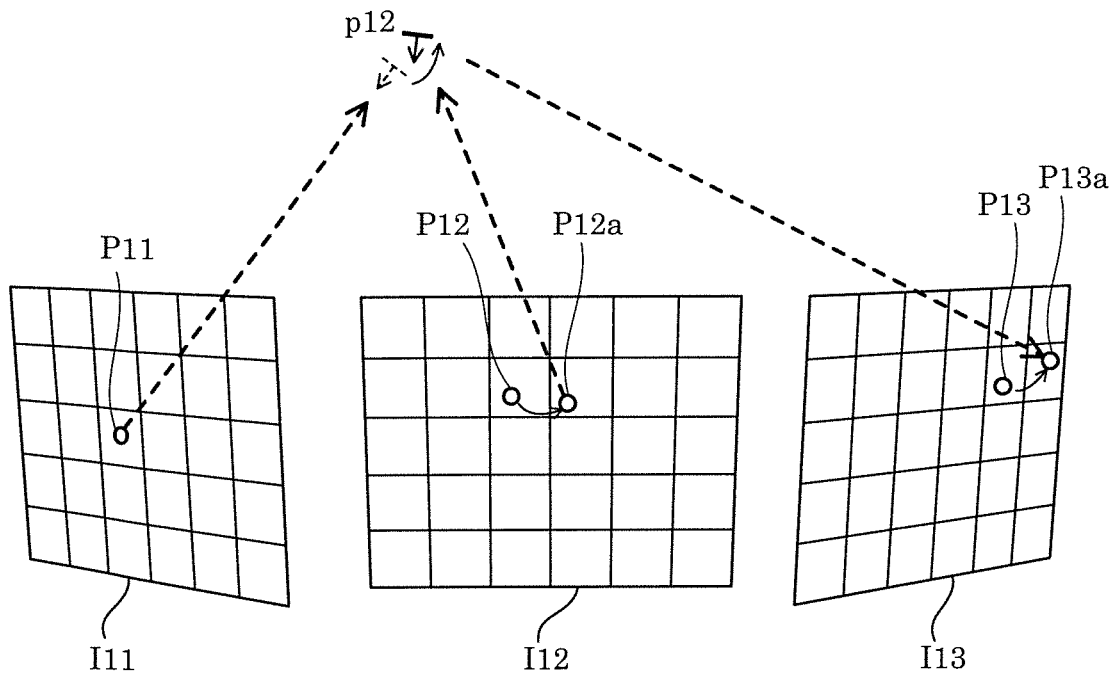
FIG. 22 is an illustration for describing a process performed by an optimizer.
Figure 23:
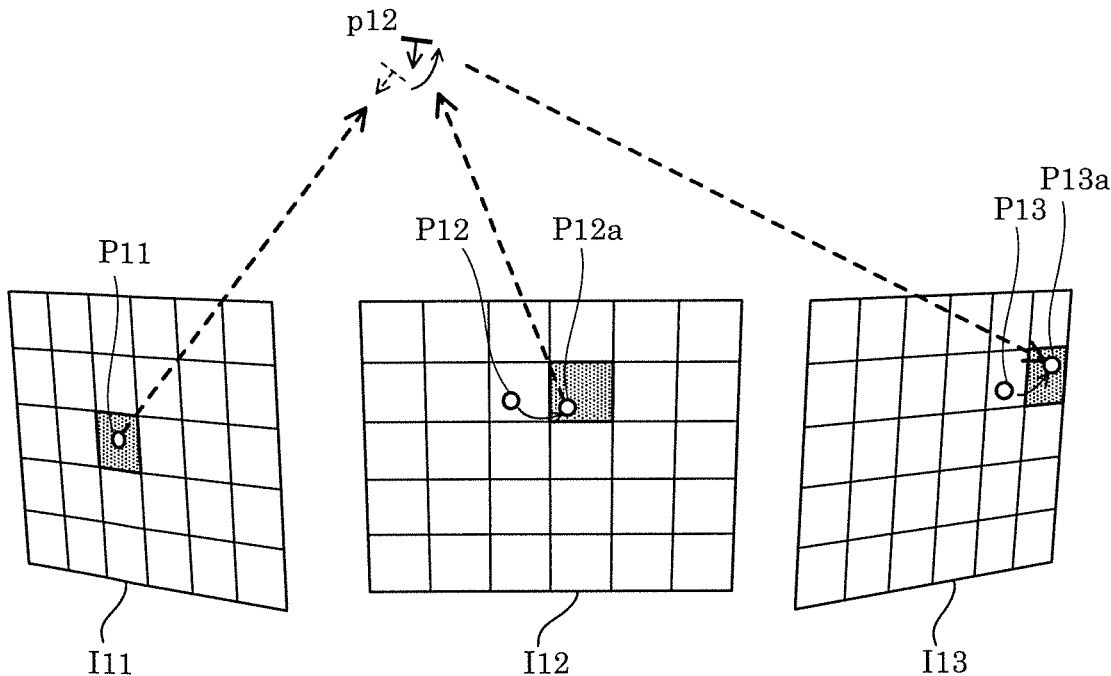
FIG. 23 is another illustration for describing a process performed by an optimizer.

Next, a specific example of loop 4 will be described with reference to FIGS. 20 to 23. FIG. 20 is an illustration for describing a process performed by correspondence point candidate selector 518 and candidate patch calculator 519. FIG. 21 is an illustration for describing a process performed by frame selector 520. FIGS. 22 and 23 are illustrations for describing a process performed by optimizer 521.

Loop 4 is performed for each of a plurality of feature points included in a reference frame, or one of the two frames of a second pair to be processed, and steps S518 to S522 are performed in loop 4. Loop 4 is an example of a third loop. The plurality of feature points used in loop 4 are a plurality of feature points detected by feature point detector 511 from each of the n frames.

As illustrated in FIG. 20, in step S518, correspondence point candidate selector 518 performs the second matching to calculate, with integer pixel accuracy, one or more correspondence point candidates that correspond to feature point P11 to be processed from the other one of the two frames of the second pair to be processed (i.e., from frame I12 different from reference frame I11) (S518). The second matching is a process of matching a plurality of feature points calculated in each of the two frames between the two frames of the second pair to be processed based on the geometric consistency between reference frame I11 and frame I12 with the use of the camera parameters of the two cameras that have obtained the two respective frames. Specifically, correspondence point candidate selector 518 draws epipolar line L1 for feature point P11 in reference frame I11 onto frame I12 with the use of the camera parameters of the camera that has obtained reference frame I11 and the camera parameters of the camera that has obtained frame I12. At this point, a correspondence point in frame I12 that corresponds to feature point P11 in reference frame I11 is present on epipolar line L1 drawn in frame I12. Of a plurality of feature points detected in frame I2, one or more feature points whose distance from epipolar line L1 is less than or equal to a desired threshold are calculated as correspondence point candidate(s) P12. Correspondence point candidate P12 is an example of a second correspondence point.

Next, loop 5 is executed for each of the one or more correspondence point candidates obtained in step S518. In loop 5, steps S519 to S522 are performed.

As illustrated in FIG. 20, in step S519, candidate patch calculator 519 calculates the three-dimensional position and the normal direction of three-dimensional patch p11 with the use of feature point P11 to be processed, correspondence point candidate P12 to be processed, the camera parameters of the camera that has obtained reference frame I11, and the camera parameters of the camera that has obtained frame I12 (S519). Candidate patch calculator 519 calculates the three-dimensional position of three-dimensional patch p11 through triangulation with the use of the stated camera parameters for feature point P11 in reference frame I11 and correspondence point candidate P12 in frame I12. In addition, candidate patch calculator 519 temporarily determines the direction of the straight line connecting the three-dimensional position coordinates of the camera that has captured reference frame I11 and the three-dimensional position of three-dimensional patch p11 as a tentative normal direction of three-dimensional patch p11. A camera that obtains frame I11 is an example of a sixth image capturing device. A camera that obtains frame I12 is an example of a seventh image capturing device. Three-dimensional patch p2 calculated in the above process is an example of a second three-dimensional patch.

As illustrated in FIG. 21, in step S520, frame selector 520 identifies one or more second visible frames I13 capturing three-dimensional patch p11 calculated by candidate patch calculator 519 from a plurality of frames included in a plurality of second frames excluding frames I11 and I12 of the second pair to be processed. Then, for each of identified one or more second visible frames I13, frame selector 520 calculates projection point P13, which is a two-dimensional point in second visible frame I13, by projecting three-dimensional patch p11 with the use of the camera parameters of the camera that has obtained second visible frame I13 (S520). While FIG. 21 illustrates one second visible frame I13, there may be a case where a plurality of second visible frames I13 are identified. In that case, projection point P13 is calculated for each of the plurality of second visible frames I13. Second visible frame I13 is an example of a second visible image. A camera that obtains second visible frame I13 is an example of an eighth image capturing device. Projection point P13 is an example of a second two-dimensional point.

As illustrated in FIGS. 22 and 23, in step S521, optimizer 521 corrects the three-dimensional position and the normal direction of three-dimensional patch p11, the position of correspondence point candidate P12, and the position of each of one or more projection points P13 such that the evaluation value indicating the projection consistency is minimized with the use of three-dimensional patch p11 calculated by candidate patch calculator 519 and one or more projection points P13 calculated by frame selector 520 and generates corrected three-dimensional patch p12 as a second three-dimensional point (S521). Specifically, optimizer 521 optimizes the three-dimensional position and the normal direction of three-dimensional patch p11, the position of correspondence point P12 in frame I12, and the position of projection point P13 in second visible frame I13 while keeping the position of feature point P11 in reference frame I11 fixed. Optimizer 521 optimizes the three-dimensional position of three-dimensional patch p11 while moving the stated three-dimensional position so as not to deviate from the straight line connecting the three-dimensional position of the camera that has obtained reference frame I11 and the three-dimensional position of three-dimensional patch p11. For example, optimizer 521 performs a calculation through above Expression 3 to calculate, as N(I,J,p), the normalized cross-correlation (NCC) of small regions around feature points in pairs where reference frame I11 is paired with frame I12 and each of one or more second visible frames I13. Then, the total value of the calculated NCC is used as the evaluation value indicating the projection consistency of three-dimensional patch p12 onto a visible camera. A visible camera is a camera that obtains frame I12 and each of one or more second visible frames I13 and that captures three-dimensional patch p12.

Thus, calculated three-dimensional patch p12 includes the three-dimensional position, the normal direction, and visible frame information indicating frame I12 and one or more second visible frames I13, or visible frames capturing three-dimensional patch p12.

In the optimization, the value of each parameter that can maximize the total value of N(I,J,p) or minimize 1−{the total value of N(I,J,p)} is calculated while finely moving the three-dimensional position and the normal direction of three-dimensional patch p11, the position of correspondence point candidate P12 in frame I12, and the position of each of one or more projection points P13 in one or more second visible frames I13. Thus, three-dimensional patch p12 in which the three-dimensional position and the normal direction of three-dimensional patch p11 are optimized can be obtained, correspondence point candidate P12a in which the position of correspondence point candidate P12 in frame I12 is optimized can be obtained, and projection point P13a in which the position of each of one or more projection points P13 in one or more second visible frames I13 is optimized can be obtained.

In step S522, evaluator 522 determines whether the total value of optimized N(I,J,p) is greater than or equal to a desired threshold or whether 1−{the total value of N(I,J,p)} is less than or equal to a desired threshold. When the total value of optimized N(I,J,p) is greater than or equal to the desired threshold or when 1−{the total value of N(I,J,p)} is less than or equal to the desired threshold, evaluator 522 stores calculated three-dimensional patch p12 into a memory as a second three-dimensional point.

In loop 4 in the first generating, a three-dimensional point cloud is generated with the use of the second matching that is based on the geometric consistency for the two frames of the second pair obtained by the two cameras having respective fields of view with a degree of similarity lower than a predetermined threshold. This can help reduce the possibility that a low-accuracy three-dimensional point is generated and the process takes an extended time.

In this manner, in the first generating, three-dimensional patch p1 is generated as loop 3 is performed, and three-dimensional patch p12 is generated as loop 4 is performed. Thus, in the first generating, a sparse three-dimensional point cloud is generated, and an initial three-dimensional model including the sparse three-dimensional point cloud is generated.

Next, the detailed process of the second generating will be described with reference to FIGS. 24 to 35.

Figure 24:
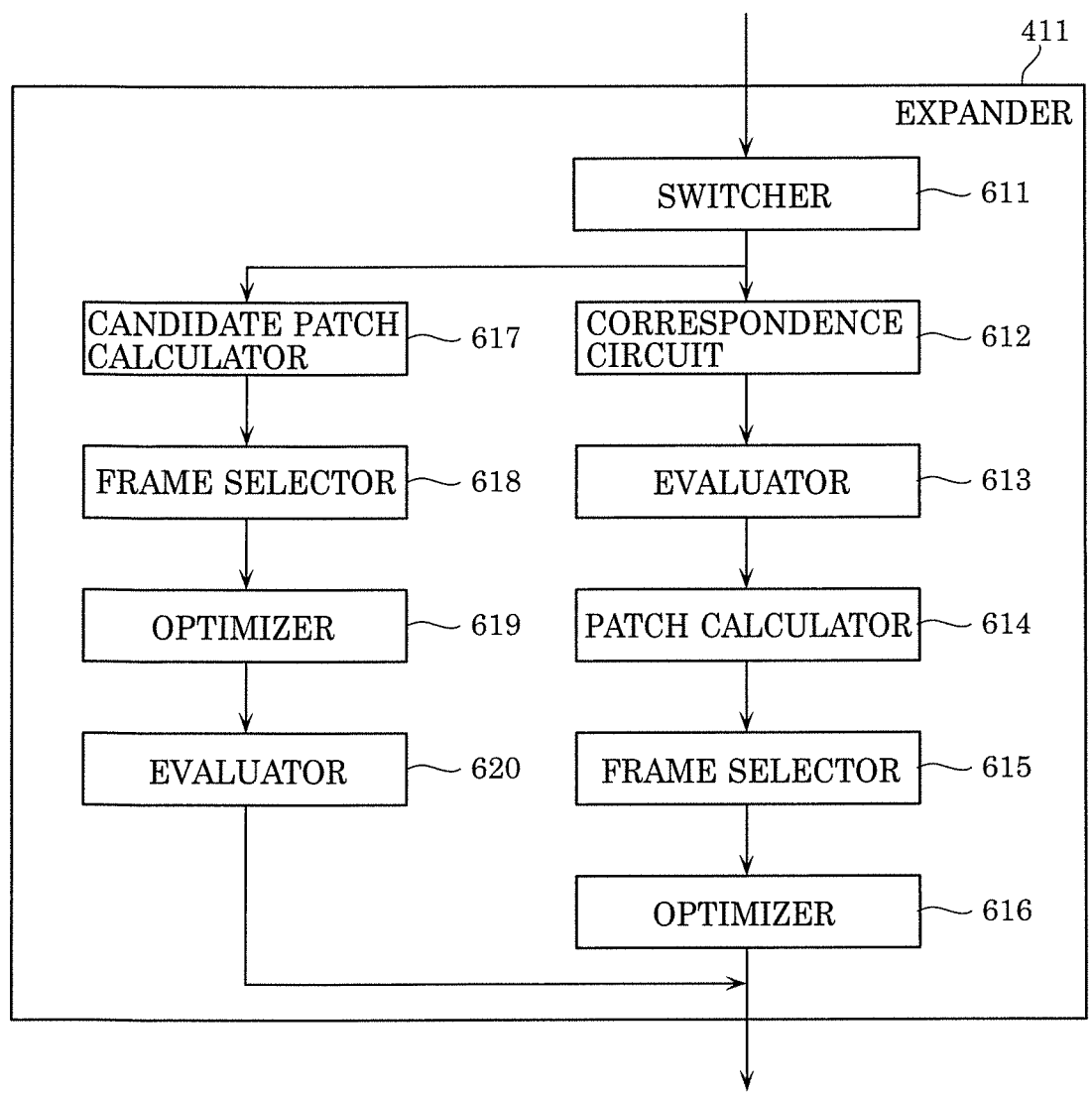
FIG. 24 is a block diagram illustrating an example of a structure of an expander.
Figure 25:
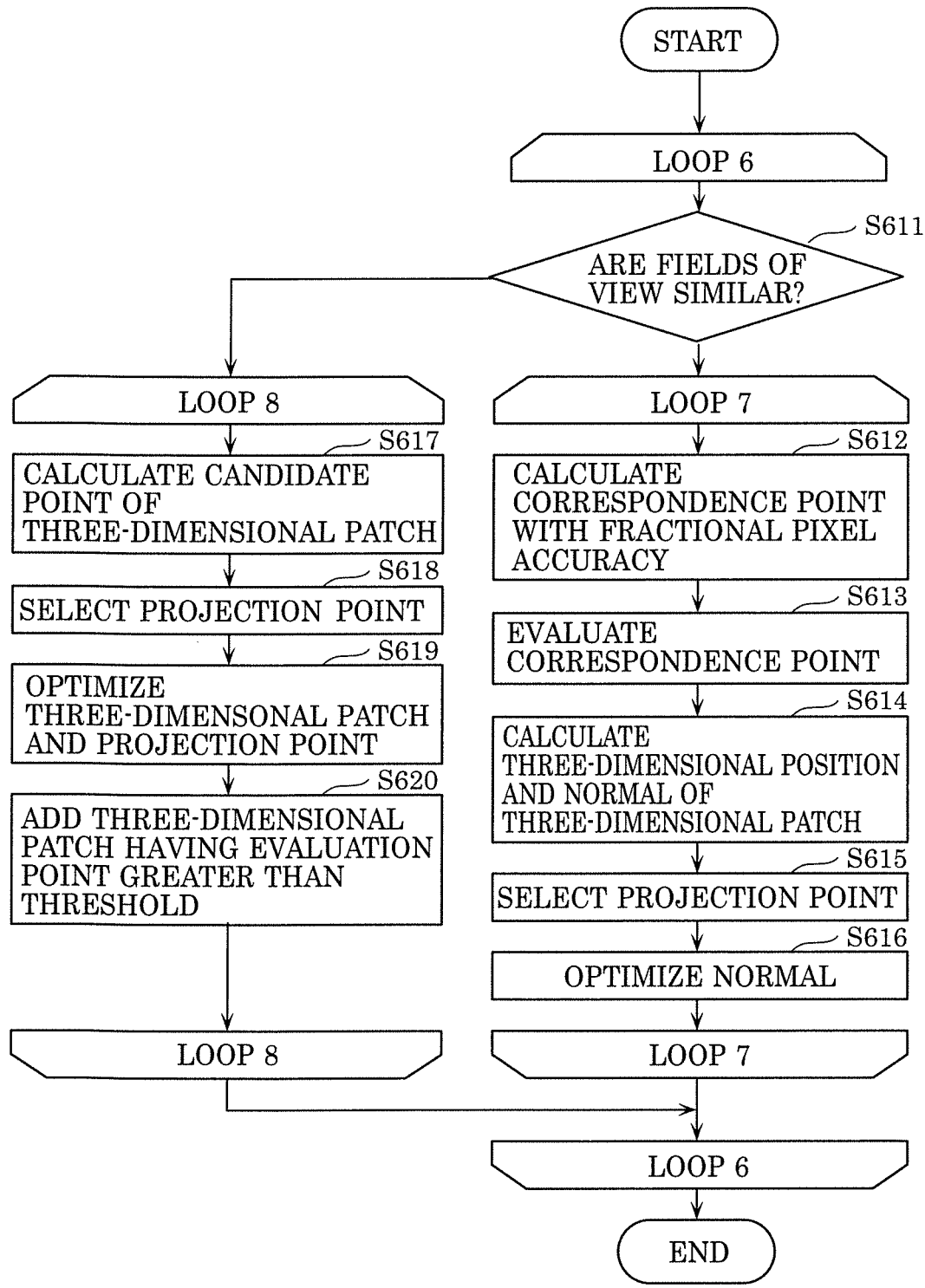
FIG. 25 is a flowchart illustrating an example of an operation of an expander.

FIG. 24 is a block diagram illustrating an example of a structure of expander 411. FIG. 25 is a flowchart illustrating an example of an operation of expander 411.

Herein, each block of expander 411 will be described with reference to FIG. 24, and the flow of the processes performed in the blocks will be described with reference to FIG. 25.

Expander 411 includes switcher 611, correspondence circuit 612, evaluator 613, patch calculator 614, frame selector 615, optimizer 616, candidate patch calculator 617, frame selector 618, optimizer 619, and evaluator 620.

In the second generating, first, loop 6 of repeating the processes in steps S611 to S620 is performed for each of the n frames captured at corresponding timings. The following processes are executed in loop 6. Specifically, in loop 6, one frame is selected from the n frames to serve as a reference frame, the selected reference frame is paired with each of the (n−1) frames excluding the reference frame from the n frames to generate a plurality of pairs of frames, and loop 6 is executed for each of the plurality of generated pairs of frames. In other words, loop 6 is executed for each of all the possible combinations that can be formed when any two frames are selected from the n frames. Loop 6 is an example of a fifth loop.

Switcher 611 determines whether the fields of view of the two cameras that have captured the two frames of a pair to be processed are similar to each other (S611). For the degree of similarity between the fields of view of the two cameras used in this determination, the same value as the value used for the degree of similarity in step S512 is used. In other words, the degree of similarity calculated by degree of similarity calculator 510 is used. Switcher 611 acquires, from initial generator 410, the degree of similarity calculated by degree of similarity calculator 510 in initial generator 410 and makes the determination in step S611 with the use of the acquired degree of similarity.

When it is determined in step S611 that the fields of view of the two cameras are similar to each other, loop 7 is executed. Loop 7 is executed for each of a plurality of three-dimensional points composing a sparse three-dimensional point cloud. The process in loop 7 is an example of a process of performing the first matching between two or more first frames on each of a plurality of neighboring three-dimensional points in the vicinity of a plurality of third three-dimensional points based on the neighboring three-dimensional points and the two or more first frames and generating one or more new first three-dimensional points based on the obtained result of the first matching.

Meanwhile, when it is determined in step S611 that the fields of view of the two cameras are not similar to each other, loop 8 is executed. Loop 8 is an example of a process of performing the second matching between two or more second frames on each of a plurality of neighboring three-dimensional points in the vicinity of a plurality of third three-dimensional points composing a sparse three-dimensional point cloud based on the neighboring three-dimensional points and the two or more second frames and generating one or more new second three-dimensional points based on the obtained result of the second matching.

Figure 26:
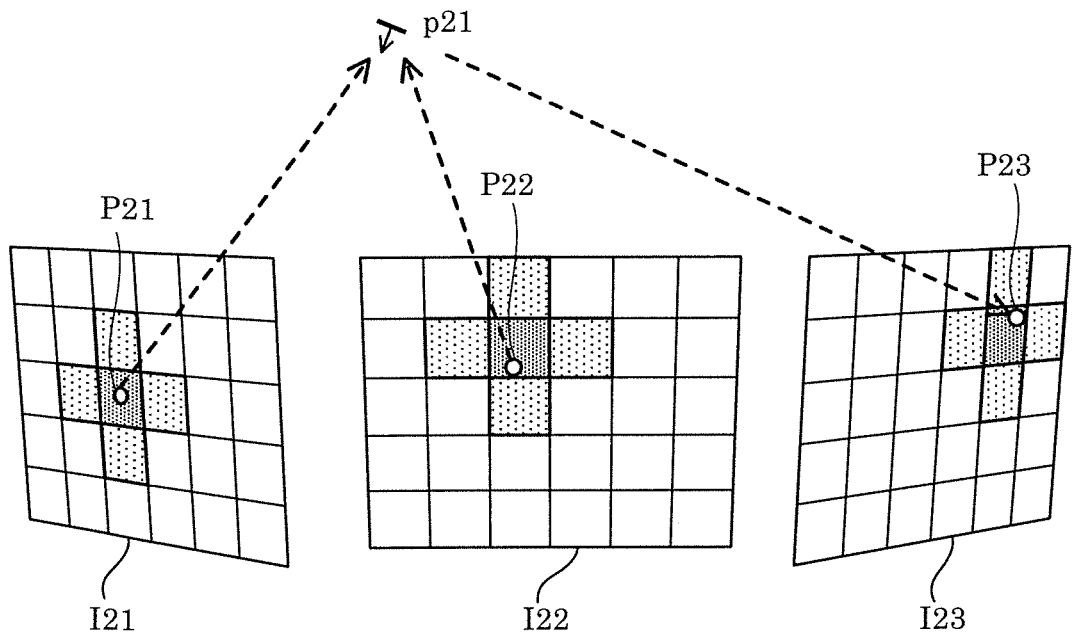
FIG. 26 is an illustration for describing a process performed by an expander.
Figure 27:
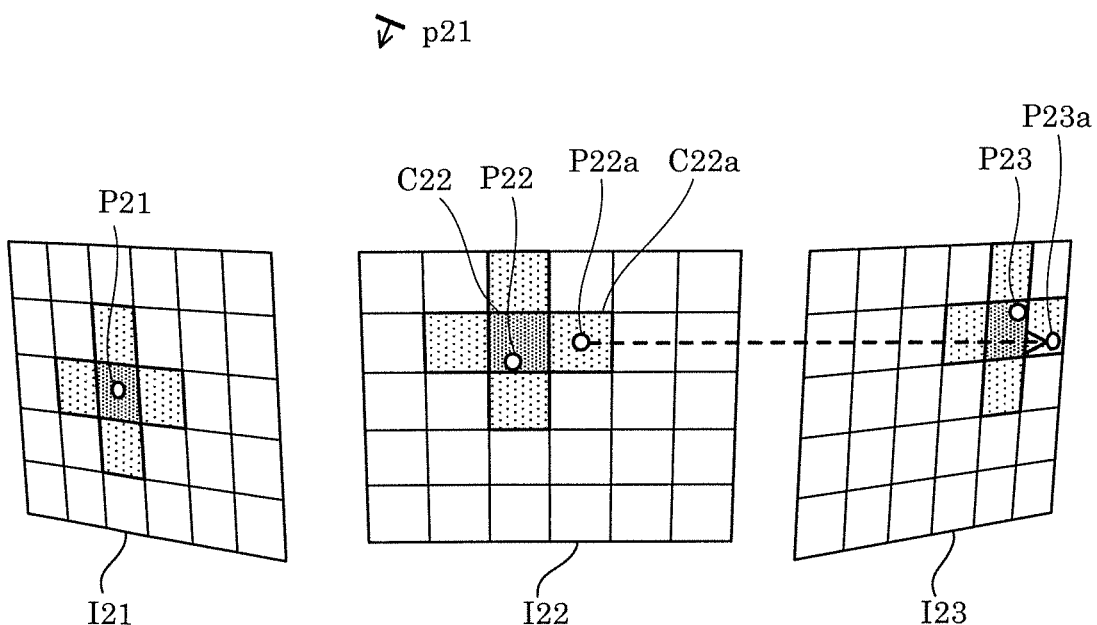
FIG. 27 is an illustration for describing a process performed by a correspondence circuit.
Figure 28:
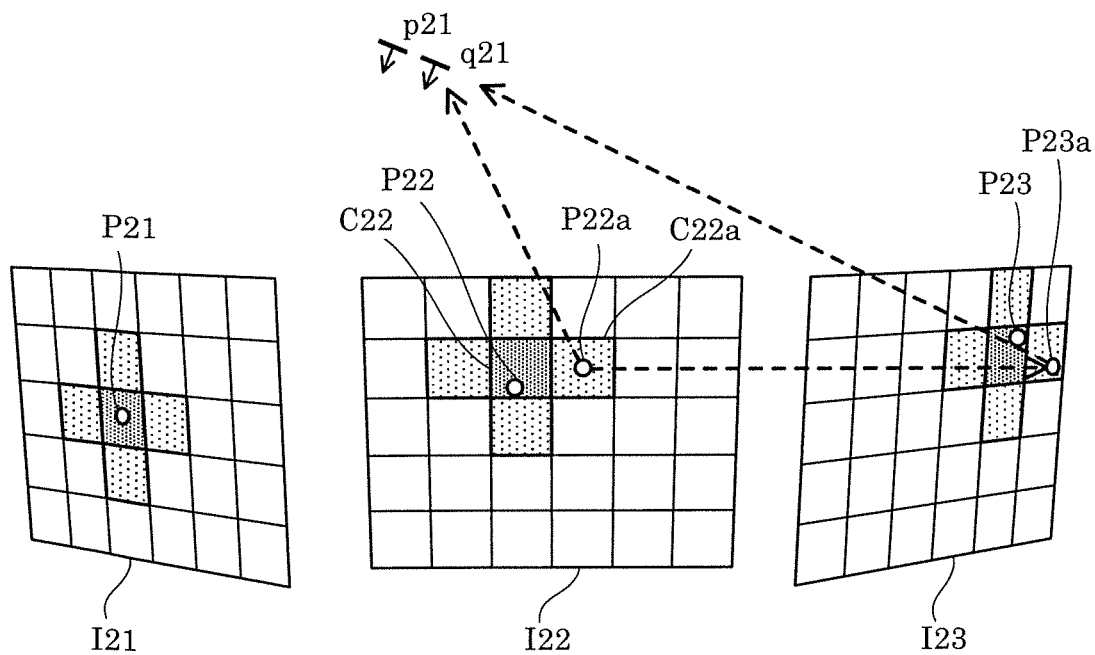
FIG. 28 is an illustration for describing a process performed by an evaluator and a patch calculator.
Figure 29:
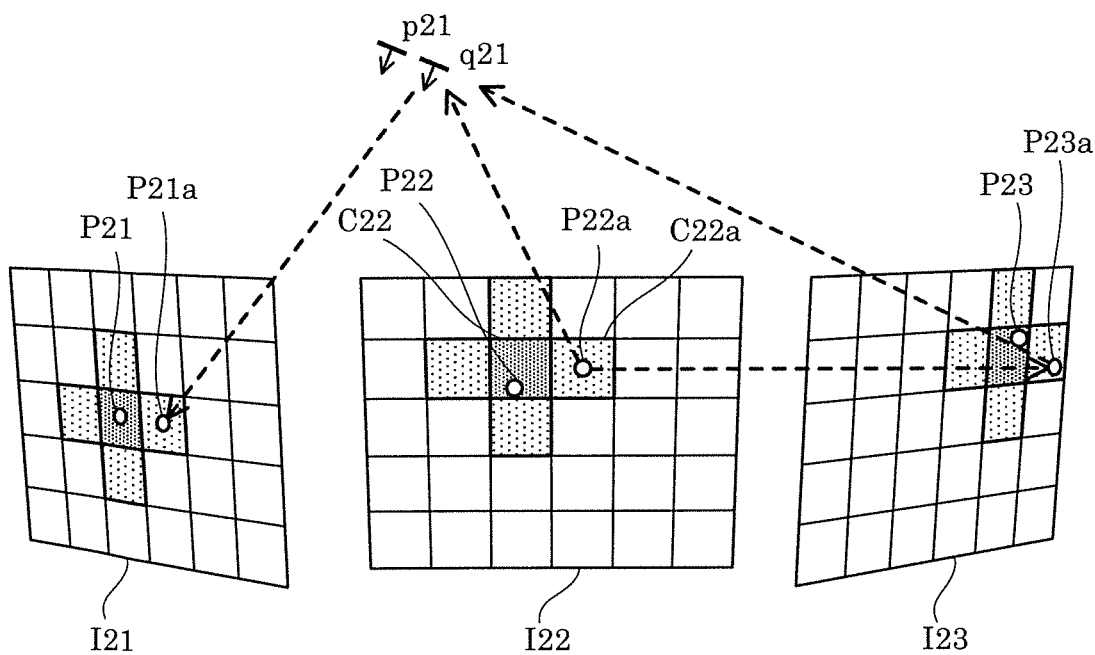
FIG. 29 is an illustration for describing a process performed by a frame selector.
Figure 30:
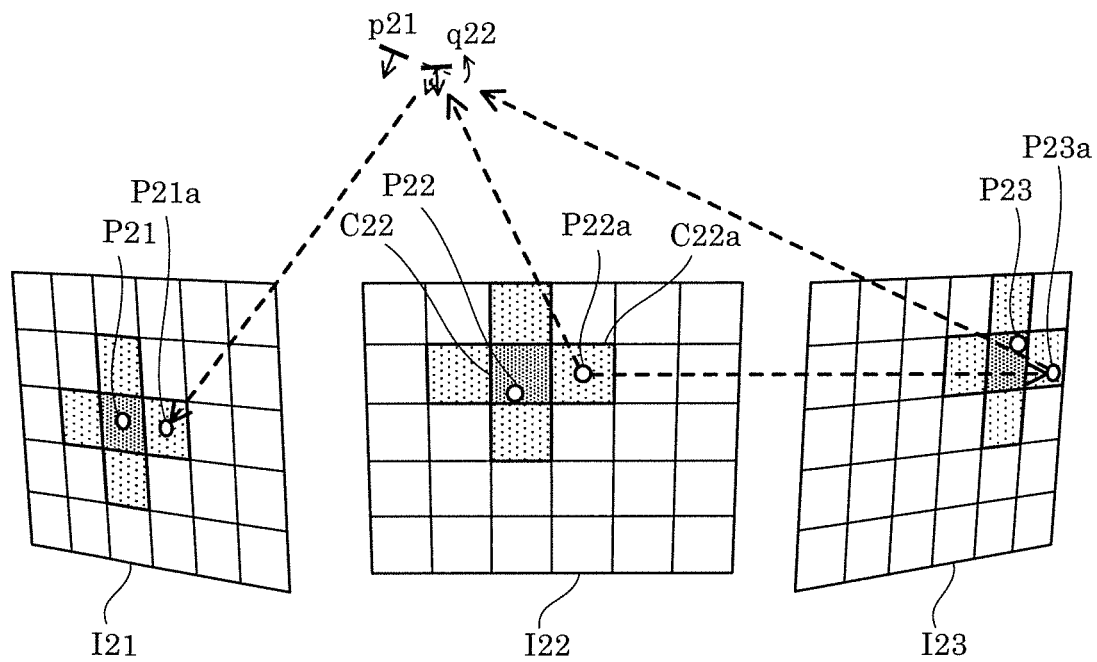
FIG. 30 is an illustration for describing a process performed by an optimizer.

Now, a specific example of loop 7 will be described with reference to FIGS. 26 to 30. FIG. 26 is an illustration for describing a process performed by expander 411. FIG. 27 is an illustration for describing a process performed by correspondence circuit 612. FIG. 28 is an illustration for describing a process performed by evaluator 613 and patch calculator 614. FIG. 29 is an illustration for describing a process performed by frame selector 615. FIG. 30 is an illustration for describing a process performed by optimizer 616.

As illustrated in FIG. 26, loop 7 is performed for each of the plurality of three-dimensional points, and a process of expanding (increasing) the three-dimensional points based on reference patch p21, or the three-dimensional points, is performed in loop 7. Loop 7 is an example of a sixth loop. In addition, the process of loop 7 is performed for each of one or more visible frames capturing reference patch p21 to be processed. The process of loop 7 may be performed on a pixel by pixel basis in each frame or on a small region by small region basis, where each small region is composed of 2 pixels by 2 pixels, for example. In other words, one three-dimensional point may be generated for each unit of processing. This unit of processing is referred to as a cell. One cell is indicated by one rectangle in frames I21 to I23 in FIGS. 26 to 30. In the example described below, expansion is performed with frame I22 serving as a reference frame.

As illustrated in FIG. 27, correspondence circuit 612 calculates projection point P22 in reference frame I22 by projecting reference patch p21 to be processed onto reference frame 22 of a first pair to be processed. Then, correspondence circuit 612 performs the first matching to calculate, with fractional pixel accuracy, correspondence point P23a that corresponds to two-dimensional point P22a in second cell C22a, of the plurality of cells composing reference frame I22, adjacent to first cell C22 that includes identified projection point P22 from frame I23 of the first pair to be processed (S612). Correspondence circuit 612 calculates correspondence point P23a that corresponds to two-dimensional point P22a in reference frame I22 from frame I23 by performing the first matching with high fractional pixel accuracy, as in the phase-only correlation method described in Takita et al. (2004), for example. Correspondence point P23a is an example of a third correspondence point.

In step S612, a correspondence point is calculated for frame I23 that is paired with reference frame 22 to form the first pair, but this is not a limiting example. A correspondence point that corresponds to two-dimensional point P22a in second cell C22a of reference frame I22 may be calculated from each of the plurality of visible frames capturing reference patch p21. Alternatively, such a correspondence point may be calculated from a neighboring frame captured by a camera in the vicinity of the camera that has captured reference frame I22. Alternatively, such a correspondence point may be calculated from a frame captured by a camera having a field of view with a high degree of similarity to that of the camera that has captured reference frame I22 of all of the frames other than the reference frame.

In step S613, evaluator 613 evaluates correspondence point P23a calculated by correspondence circuit 612 (S613). Evaluator 613 determines whether the evaluation value obtained through the evaluation is greater than or equal to a second evaluation value. When the evaluation value is greater than or equal to the second evaluation value, evaluator 613 determines to add, to a three-dimensional point cloud, a three-dimensional patch to be calculated later by patch calculator 614 with the use of correspondence point P23a. In this case, step S614 that follows is executed thereafter. Meanwhile, when the evaluation value is less than the second evaluation value, steps S612 to S616 are executed for a two-dimensional point in a cell different from the next first cell and second cell without executing the processes in steps S614 to 616 that follow. Specifically, evaluator 613 calculates a peak value of an evaluation function of the phase-only correlation method as the evaluation value.

As illustrated in FIG. 28, in step S614, patch calculator 614 calculates the three-dimensional position of three-dimensional patch q21 through triangulation with the use of two-dimensional point P22a, correspondence point P23a calculated by correspondence circuit 612, the camera parameters of the camera that has obtained reference frame I22, and the camera parameters of the camera that has obtained frame I23 (S614). Three-dimensional patch q21 is an example of a neighboring three-dimensional point. Patch calculator 614 temporarily determines the direction parallel to the straight line connecting the three-dimensional position of the camera that has obtained reference frame 22 and the three-dimensional position of three-dimensional patch q21 as a tentative normal direction of three-dimensional patch q21. Herein, since obtained three-dimensional patch q21 is already set to be added as a dense three-dimensional point cloud, this three-dimensional patch q21 may be stored into a memory as a new first three-dimensional point. A camera that obtains reference frame I22 is an example of a ninth image capturing device. A camera that obtains frame I23 is an example of a tenth image capturing device. Three-dimensional patch q21 calculated in the above process is an example of a third three-dimensional patch.

As illustrated in FIG. 29, in step S615, frame selector 615 identifies one or more third visible frames I21 capturing three-dimensional patch q21 calculated by patch calculator 614 from a plurality of frames included in a plurality of first frames excluding frames 22 and I23 of the first pair to be processed. Then, for each of identified one or more third visible frames I21, frame selector 615 calculates projection point P21a, which is a two-dimensional point in third visible frame I21, by projecting three-dimensional patch q21 with the use of the camera parameters of the camera that has obtained third visible frame I21 (S615). While FIG. 29 illustrates one third visible frame I21, there may be a case where a plurality of third visible frames I21 are identified. In that case, projection point P21a is calculated for each of the plurality of third visible frames I21. Third visible frame I21 is an example of a third visible image. A camera that obtains third visible frame I21 is an example of an eleventh image capturing device. Projection point P21a is an example of a fifth two-dimensional point.

As illustrated in FIG. 30, in step S616, optimizer 616 corrects the normal direction of three-dimensional patch q21 such that the evaluation value indicating the projection consistency is minimized with the use of three-dimensional patch q21 calculated by patch calculator 614 and one or more projection points P21a calculated by frame selector 615 and generates corrected three-dimensional patch q22 as a new first three-dimensional point (S616). Specifically, optimizer 616 optimizes the normal direction of three-dimensional patch q21, the position of correspondence point P23a in frame I23, and the position of projection point P21a in third visible frame I21 while keeping the position of two-dimensional point P22a in reference frame I22 and the three-dimensional position of three-dimensional patch q21 fixed. For example, optimizer 616 performs a calculation through Expression 3 to calculate, as N(I,J,p), the normalized cross-correlation (NCC) of small regions around feature points in pairs where reference frame I22 is paired with frame I23 and each of one or more third visible frames I21. Then, the total value of the calculated NCC is used as the evaluation value indicating the projection consistency of three-dimensional patch q22 onto a visible camera. A visible camera is a camera that obtains frame I23 and each of one or more third visible frames I21 and that captures three-dimensional patch q22.

Thus, calculated three-dimensional patch q22 includes the three-dimensional position, the normal direction, and visible frame information indicating frame I23 and one or more third visible frames I21, or visible frames capturing three-dimensional patch q22. Calculated three-dimensional patch q22 is stored into a memory as a new first three-dimensional point.

In loop 7 in the second generating, the three-dimensional position of a three-dimensional point is calculated with the use of the first matching of matching feature points with high accuracy for the two frames of a first pair obtained by the two cameras having respective fields of view with a degree of similarity higher than or equal to a predetermined threshold. Therefore, any error in the three-dimensional position can be reduced. In addition, an error present when optimizer 616 starts the process is small, and the number of parameters can be reduced. Therefore, the conversion through optimization can be accelerated, and the processing time can be shortened.

Figure 31:
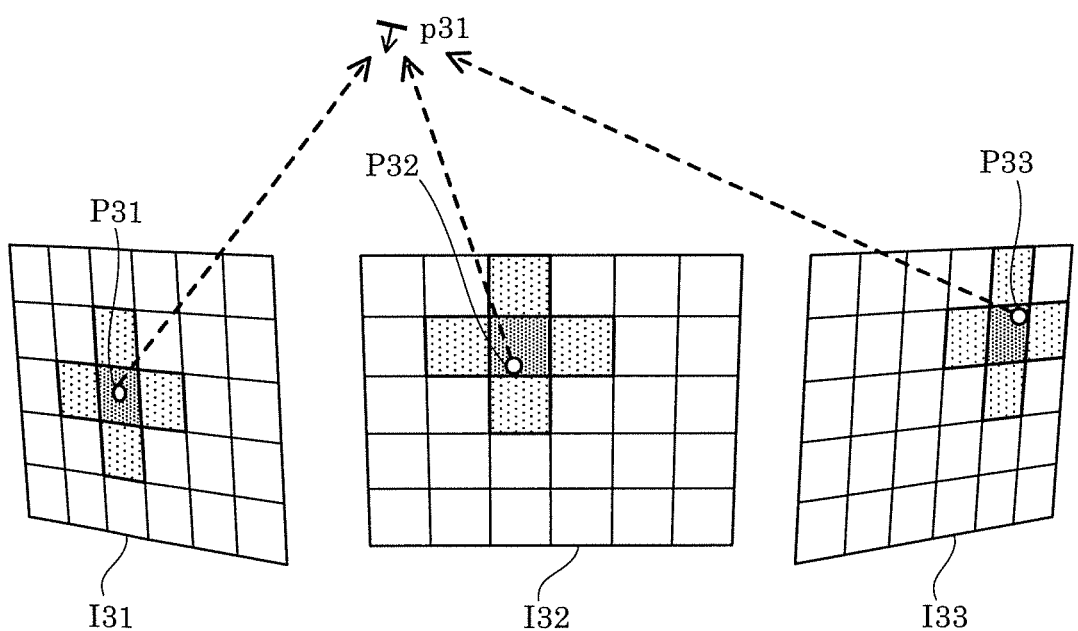
FIG. 31 is an illustration for describing a process performed by an expander.
Figure 32:
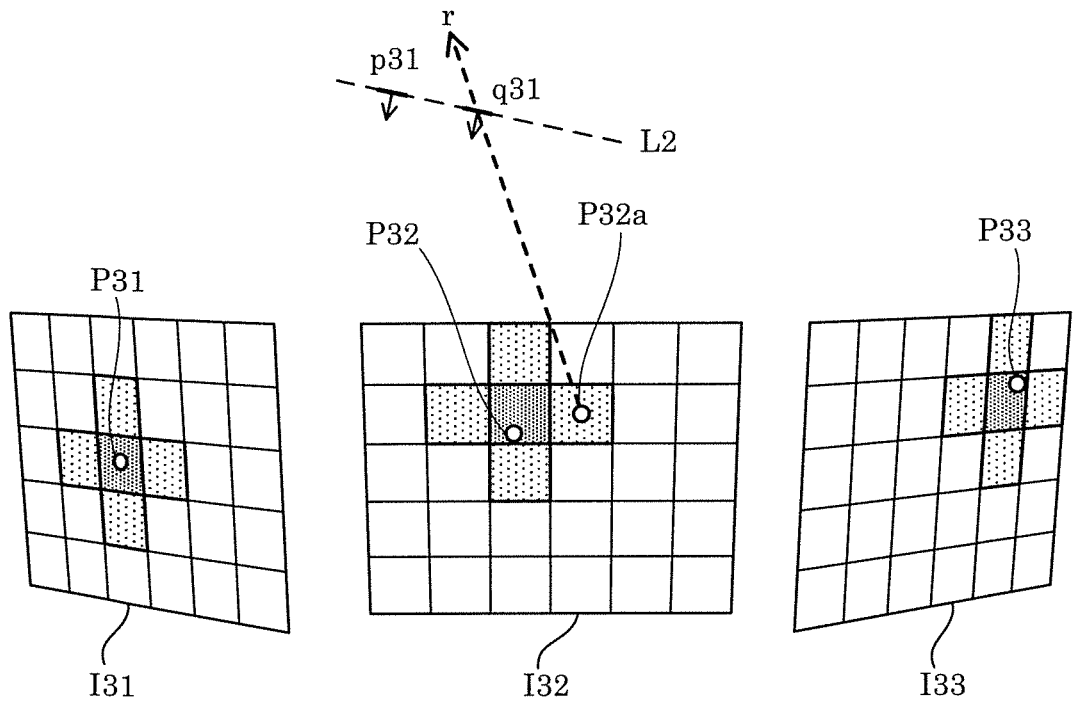
FIG. 32 is an illustration for describing a process performed by a candidate patch calculator.
Figure 33:
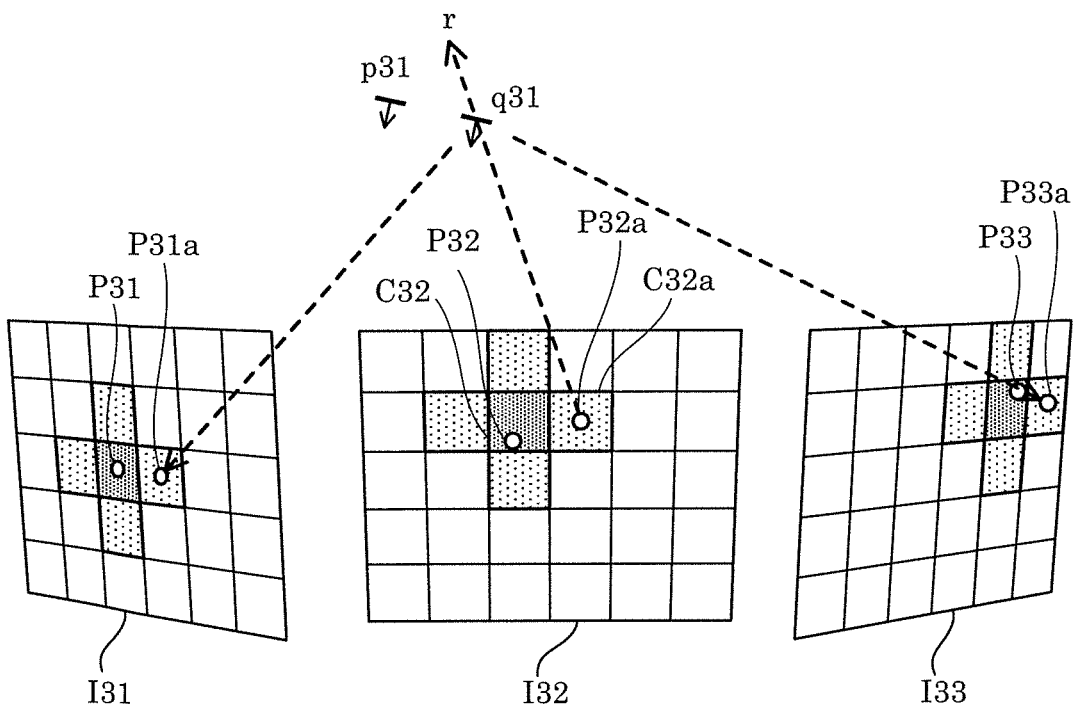
FIG. 33 is an illustration for describing a process performed by a frame selector.
Figure 34:
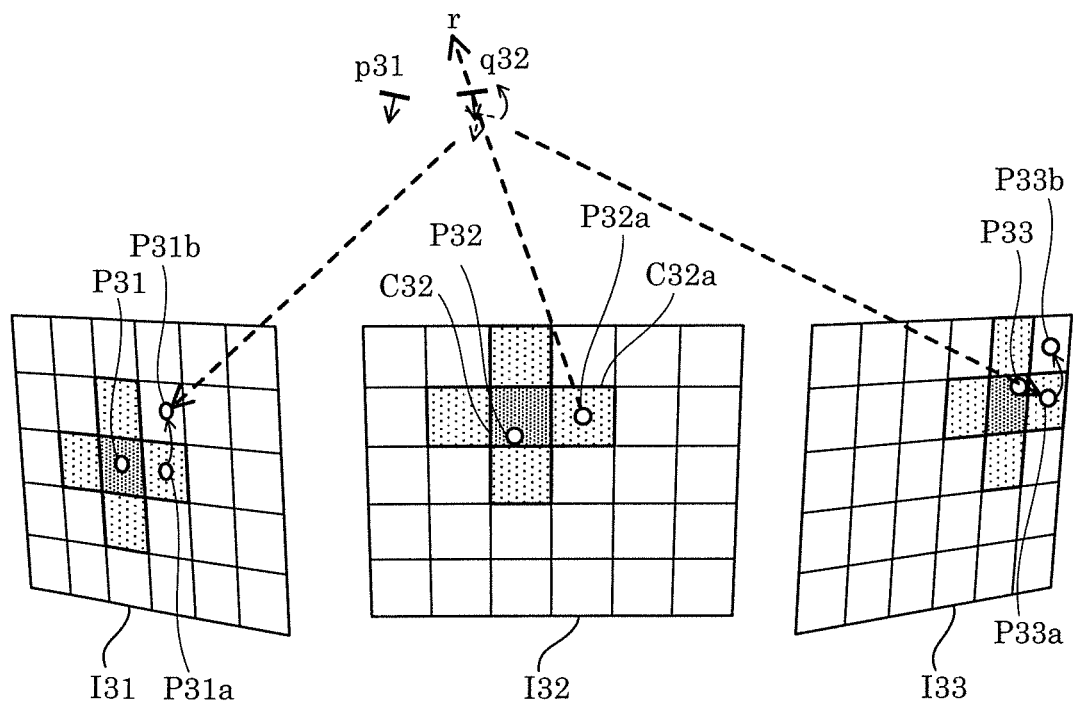
FIG. 34 is an illustration for describing a process performed by an optimizer.
Figure 35:
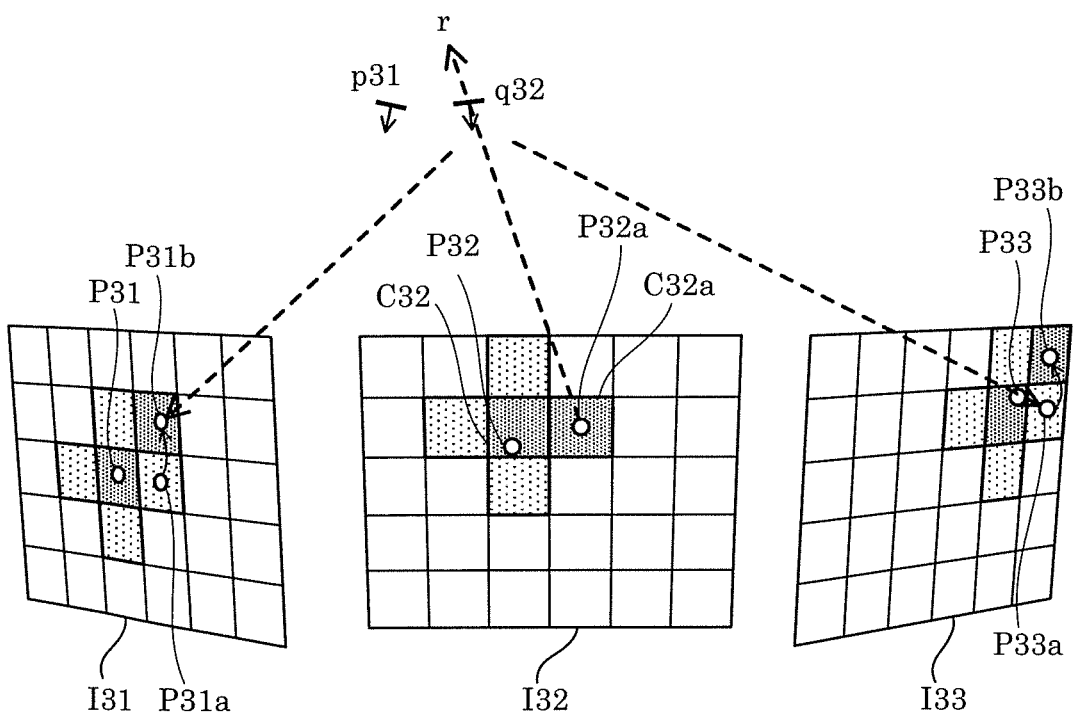
FIG. 35 is an illustration for describing a process performed by an evaluator.

Next, a specific example of loop 8 will be described with reference to FIGS. 31 to 35. FIG. 31 is an illustration for describing a process performed by expander 411. FIG. 32 is an illustration for describing a process performed by candidate patch calculator 617. FIG. 33 is an illustration for describing a process performed by frame selector 618. FIG. 34 is an illustration for describing a process performed by optimizer 619. FIG. 35 is an illustration for describing a process performed by evaluator 620.

As illustrated in FIG. 31, loop 8 is performed for each of a plurality of three-dimensional points, and a process of expanding (increasing) the three-dimensional points based on reference patch p31, or the three-dimensional points, is performed in loop 8. Loop 8 is an example of a seventh loop. In addition, the process of loop 8 is performed for each of one or more visible frames capturing reference patch p31 to be processed. The process of loop 8 may be performed on a pixel by pixel basis in each frame or on a small region by small region basis, where each small region is composed of 2 pixels by 2 pixels, for example. In other words, one three-dimensional point may be generated for each unit of processing. This unit of processing is referred to as a cell. One cell is indicated by one rectangle in frames I31 to I33 in FIGS. 31 to 35. In the example described below, expansion is performed with frame I32 serving as a reference frame.

As illustrated in FIG. 32, in step S617, candidate patch calculator 617 calculates projection point P32 in reference frame I32 by projecting reference patch p31 to be processed onto reference frame I32 of a second pair to be processed. Then, candidate patch calculator 617 calculates, as the three-dimensional position of three-dimensional patch q31, the three-dimensional position of an intersection in a reference patch plane of reference patch p31 to be processed where the reference patch plane intersects with optical axis r of the camera that has obtained reference frame I32 passing through two-dimensional point P32a in fourth cell C32a, of the plurality of cells composing reference frame I32, adjacent to third cell C32 that includes identified projection point P32 (S617). Three-dimensional patch q31 is an example of a neighboring three-dimensional point. Optical axis r of the camera that has obtained reference frame I32 is calculated with the use of the camera parameters of this camera. Candidate patch calculator 617 temporarily determines the normal direction of reference patch p31 as the normal direction of three-dimensional patch q31. Projection point P32 is an example of a sixth two-dimensional point. A camera that obtains reference frame I32 is an example of a twelfth image capturing device.

As illustrated in FIG. 33, in step S618, frame selector 618 identifies one or more fourth visible frames I31 capturing three-dimensional patch q31 calculated by candidate patch calculator 617 from a plurality of frames included in a plurality of second frames excluding frames I32 and I33 of the second pair to be processed. Then, for each of identified one or more fourth visible frames I31 and I33, frame selector 618 calculates projection points P31a and P33a, which are two-dimensional points in fourth visible frames I31 and I33, by projecting three-dimensional patch q31 with the use of the camera parameters of the cameras that have obtained fourth visible frames I31 and I33 (S618). While FIG. 33 illustrates two fourth visible frames I31 and I33, there may be a case where three or more fourth visible frames are identified. In that case, a projection point is calculated for each of the three or more fourth visible frames. Fourth visible frames I31 and I33 are examples of a fourth visible image. A camera that obtains fourth visible frame I31 or I33 is an example of a thirteenth image capturing device. Projection points P31a and P33a are examples of an eighth two-dimensional point.

As illustrated in FIGS. 34 and 35, in step S619, optimizer 619 corrects the three-dimensional position and the normal direction of three-dimensional patch q31 and the position of each of one or more projection points P31a and P33a such that the evaluation value indicating the projection consistency is minimized with the use of three-dimensional patch q31 calculated by candidate patch calculator 617 and one or more projection points P31a and P33a calculated by frame selector 618 and generates corrected three-dimensional patch q32 as a new second three-dimensional point (S619). Specifically, optimizer 619 optimizes the three-dimensional position and the normal direction of three-dimensional patch q31 and the positions of projection points P31a and P33a in fourth visible frames I31 and I33 while keeping the position of two-dimensional point P32a in reference frame I32 fixed. Optimizer 619 optimizes the three-dimensional position of three-dimensional patch q31 while moving the three-dimensional position so as not to deviate from optical axis r. For example, optimizer 619 performs a calculation through above Expression 3 to calculate, as N(I,J,p), the normalized cross-correlation (NCC) of small regions around feature points in pairs where reference frame I32 is paired with each of one or more fourth visible frames I31 and I33. Then, the total value of the calculated NCC is used as the evaluation value indicating the projection consistency of three-dimensional patch q32 onto a visible camera. A visible camera is a camera that obtains each of one or more fourth visible frames I31 and I33 and that captures three-dimensional patch q32.

Thus, calculated three-dimensional patch q32 includes the three-dimensional position, the normal direction, and visible frame information indicating one or more fourth visible frames I31 and I33, or visible frames capturing three-dimensional patch q32.

In the optimization, the value of each parameter that can maximize the total value of N(I,J,p) or minimize 1−{the total value of N(I,J,p)} is calculated while finely moving the three-dimensional position and the normal direction of three-dimensional patch q31 and the position of each of one or more projection points P31a and P33a in one or more fourth visible frames I31 and I33. Thus, three-dimensional patch q32 in which the three-dimensional position and the normal direction of three-dimensional patch q31 are optimized can be obtained, and projection points P31b and P33b in which the position of each of one or more projection points P31a and P33a in one or more fourth visible frames I31 and I33 is optimized can be obtained.

In step S620, evaluator 620 determines whether the total value of optimized N(I,J,p) is greater than or equal to a desired threshold or whether 1−{the total value of N(I,J,p)} is less than or equal to a desired threshold. When the total value of optimized N(I,J,p) is greater than or equal to the desired threshold or when 1−{the total value of N(I,J,p)} is less than or equal to the desired threshold, evaluator 620 stores calculated three-dimensional patch q32 into a memory as a new second three-dimensional point.

In this manner, in the second generating, new three-dimensional patch q22 is generated as loop 7 is performed, and new three-dimensional patch q32 is generated as loop 8 is performed. Thus, in the second generating, a dense three-dimensional point cloud is generated based on a sparse three-dimensional point cloud, and a three-dimensional model including the dense three-dimensional point cloud is generated.

In loop 8 in the second generating, a three-dimensional point cloud is generated with the use of the second matching that is based on the geometric consistency for the two frames of the second pair obtained by the two cameras having respective fields of view with a degree of similarity lower than a predetermined threshold. This can help reduce the possibility that a low-accuracy three-dimensional point is generated and the process takes an extended time.

Advantageous Effects and Others

With the three-dimensional reconstruction method according to the present embodiment, a high-accuracy first matching is performed to generate one or more first three-dimensional points for frames in a first pair obtained by two or more cameras having respective fields of view with a high degree of similarity, and thus a highly accurate three-dimensional point can be obtained at high speed. Meanwhile, a second matching that is based on geometric consistency is performed to generate one or more second three-dimensional points for frames in a second pair obtained by two or more cameras having respective fields of view with a low degree of similarity, and thus the possibility that a low-accuracy three-dimensional point is generated and the process takes an extended time can be reduced. In this manner, one of the first matching and the second matching is selectively executed depending on the degree of similarity between the fields of view, and thus a highly accurate three-dimensional model can be generated at high speed.

OTHERS

In the foregoing embodiment, the high-accuracy first matching is a matching with fractional pixel accuracy as in S513 and S612, and the second matching with an accuracy lower than the accuracy of the first matching is a matching with integer pixel accuracy as in S518 and S617, but this is not a limiting example. The first matching and the second matching may each be a matching with fractional pixel accuracy. In this case, as described in the examples in the foregoing embodiment, the phase-only correlation method is used in S513 and S612, and normalized cross-correlation technique is used in S518 and S617. Typically, when a matching is performed between images having respective fields of view with a high degree of similarity, the phase-only correlation method has a higher accuracy among matching techniques with fractional pixel accuracy. In the foregoing embodiment, expander 411 adds a three-dimensional point based on a plurality of three-dimensional points generated by initial generator 410 in three-dimensional modeler 311, but initial generator 410 is not necessarily required. A three-dimensional point cloud acquired from the outside or a three-dimensional point cloud generated previously by three-dimensional reconstruction device 200 may be stored in storage 220, and expander 411 may add a three-dimensional point based on the stored three-dimensional point cloud.

In the foregoing embodiment, either loop 3 or loop 4 is performed depending on the degree of similarity between the fields of view of the cameras in the first generating, and either loop 7 or loop 8 is performed depending on the degree of similarity between the fields of view of the cameras in the second generating, but this is not a limiting example. For example, switcher 512 may switch between loop 3 and loop 4 depending on the degree of similarity between the fields of view of the cameras in the first generating, and only one of loop 7 or loop 8 may be performed in the second generating. Alternatively, for example, only one of loop 3 or loop 4 may be performed in the first generating, and loop 7 and loop 8 may be switched therebetween depending on the degree of similarity between the fields of view of the cameras in the second generating.

Thus far, the three-dimensional reconstruction system according to an embodiment of the present disclosure has been described, but the present disclosure is not limited to this embodiment.

Each processor included in the three-dimensional reconstruction system according to the foregoing embodiment may be implemented typically in the form of a large-scale integration (LSI), which is an integrated circuit. These processors may each be implemented by a single chip, or a part or all of the processors may be implemented by a single chip.

The circuit integration is not limited to LSI, and an integrated circuit may be implemented by a dedicated circuit or a general-purpose processor. A field-programmable gate array (FPGA) that can be programmed after LSI is manufactured or a reconfigurable processor in which the connection or the setting of the circuit cells within the LSI can be reconfigured may also be used.

In the foregoing embodiment, the constituent elements may each be implemented by dedicated hardware or may each be implemented through execution of a software program suitable for a corresponding constituent element. Each of the constituent elements may be implemented as a program executor, such as a central processing unit (CPU) or a processor, reads out a software program recorded on a recording medium, such as a hard disk or a semiconductor memory, and executes the software program.

The present disclosure may be implemented in the form of various methods to be executed by the three-dimensional reconstruction system.

The division of the blocks in the block diagrams is merely an example. A plurality of blocks may be implemented as a single block, a single block may be divided into a plurality of blocks, or some of the functions may be transferred to another block. The functions of a plurality of blocks having similar functions may be processed in parallel or through time sharing by a single piece of hardware or software.

The order of executing the steps in each flowchart is for illustrating an example for describing the present disclosure in concrete terms, and the order may differ from the ones described above. Some of the steps may be executed simultaneously (in parallel) with another step.

The three-dimensional reconstruction system according to one or more aspects has been described thus far based on the embodiment, but the present disclosure is not limited to this embodiment. Unless departing from the spirit of the present disclosure, an embodiment obtained by making various modifications that are conceivable by a person skilled in the art to the present embodiments or an embodiment obtained by combining constituent elements in different embodiments may also be included within the scope of one or more aspects.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be applied to a three-dimensional reconstruction method and a three-dimensional reconstruction device and can be applied to, for example but not limited to, a three-dimensional space recognition system, a three-dimensional reconstruction system, and a next-generation monitoring system.

What is claimed is:

1. A computer for generating a three-dimensional point, the computer comprising:
   a receiver configured to receive a first image and a second image, the first image being generated by shooting a first field of view from a first viewpoint with at least one camera, the second image being generated by shooting a second field of view from a second viewpoint with the at least one camera, the first viewpoint being different from the second viewpoint; and
   a processor coupled to the receiver, the processor being configured to:
      calculate a degree of similarity between the first field of view and the second field of view, by using a relationship between (i) a first camera parameter of the at least one camera when the first field of view is shot and (ii) a second camera parameter of the at least one camera when the second field of view is shot;
      determine whether the degree of similarity is equal to or higher than a threshold;
      perform a first matching that identifies, as corresponding points, a first position of a first feature point in the first image and a second position of a second feature point in the second image if the degree of similarity is determined to be equal to or higher than the threshold;
      perform a second matching that identifies, as corresponding points, the first position and the second position if the degree of similarity is determined to be lower than the threshold, second accuracy of the second matching being lower than first accuracy of the first matching; and
      generate the three-dimensional point based on a result of one of the first matching and the second matching, the three-dimensional point indicating a three-dimensional position in the first field of view and the second field of view.

2. The computer according to claim 1, wherein the first image and the second image are shot at a substantially same timing.

3. The computer according to claim 1, wherein the degree of similarity is calculated based on at least one of an angle or a distance, the angle being between a first view direction from the first viewpoint and a second view direction from the second viewpoint, the distance being between the first viewpoint and the second viewpoint.

4. The computer according to claim 1, wherein the first image and the second image are shot by a first camera and a second camera, respectively, in a state where: the first camera and the second camera have a first angle of view and a second angle of view, respectively; a first sensor of the first camera and a second sensor of the second camera have a first size and a second size, respectively; and the first camera and the second camera have a first focal length and a second focal length, respectively, and
   the degree of similarity is calculated based on at least one of:
      a first ratio of the first angle of view to the second angle of view;
      a second ratio of the first size to the second size; or
      a third ratio of the first focal length to the second focal length.

5. The computer according to claim 1, wherein a size of a processed unit in the second matching is larger than a size of a processed unit in the first matching such that the second accuracy is lower than the first accuracy.

6. The computer according to claim 1, wherein a phase-only correlation scheme is performed in the first matching and a normalized cross-correlation scheme is performed in the second matching such that the second accuracy is lower than the first accuracy.

7. The computer according to claim 1, wherein
the relationship includes at least one of an angle of convergence, a distance, a first ratio, a second ratio, or a third ratio,
the angle of convergence is an angle between a first optical axis of the at least one camera when the first field of view is shot and a second optical axis of the at least one camera when the second field of view is shot,
the distance is between a first camera position of the at least one camera when the first field of view is shot and a second camera position of the at least one camera when the second field of view is shot,
the first ratio is a ratio of a first angle of view of the at least one camera when the first field of view is shot to a second angle of view of the at least one camera when the second field of view is shot,
the second ratio is a ratio of a first sensor size of the at least one camera when the first field of view is shot to a second sensor size of the at least one camera when the second field of view is shot, and
the third ratio is a ratio of a first focal length of the at least one camera when the first field of view is shot to a second focal length of the at least one camera when the second field of view is shot.

8. The computer according to claim 1, wherein
the processor generates the three-dimensional point by transforming each of the first position and the second position into a position on a world coordinate system, with use of the first camera parameter and the second camera parameter.

* * * * *